(12) United States Patent
Neal

(10) Patent No.: US 10,753,709 B2
(45) Date of Patent: Aug. 25, 2020

(54) TACTICAL RAILS, TACTICAL RAIL SYSTEMS, AND FIREARM ASSEMBLIES HAVING TACTICAL RAILS

(71) Applicant: Sensors Unlimited, Inc., Princeton, NJ (US)

(72) Inventor: Henry William Neal, Aliso Viejo, CA (US)

( * ) Notice: Subject to any disclaimer, the term of this patent is extended or adjusted under 35 U.S.C. 154(b) by 0 days.

(21) Appl. No.: 15/983,048

(22) Filed: May 17, 2018

(65) Prior Publication Data
US 2019/0353462 A1 Nov. 21, 2019

(51) Int. Cl.
*F41G 11/00* (2006.01)
*G02B 6/42* (2006.01)
*G02B 23/16* (2006.01)

(52) U.S. Cl.
CPC .......... *F41G 11/003* (2013.01); *G02B 6/4206* (2013.01); *G02B 23/16* (2013.01)

(58) Field of Classification Search
CPC ...... F41G 11/003; G02B 6/4206; G02B 23/16
USPC ............................................................. 42/84
See application file for complete search history.

(56) References Cited

U.S. PATENT DOCUMENTS

| | | |
|---|---|---|
| 2,452,592 A | 11/1948 | Meyer |
| 2,627,659 A | 2/1953 | Murr |
| 2,901,750 A | 9/1959 | McMurry |
| 2,901,751 A | 9/1959 | Gales et al. |
| 2,908,943 A | 10/1959 | Miller |
| 3,320,619 A | 5/1967 | Lastnik et al. |
| 3,413,656 A | 12/1968 | Vogliano et al. |
| 3,419,334 A | 12/1968 | Hubbard |
| 3,594,062 A | 7/1971 | Disley |
| 3,640,635 A | 2/1972 | Von Hollen |
| 3,669,523 A | 6/1972 | Edwards |
| 4,044,399 A | 8/1977 | Morton |
| 4,183,646 A | 1/1980 | Tsunefuji |
| 4,584,776 A | 4/1986 | Shepherd |

(Continued)

FOREIGN PATENT DOCUMENTS

| | | |
|---|---|---|
| CN | 202057884 | 11/2011 |
| CN | 204730844 | 10/2015 |

(Continued)

OTHER PUBLICATIONS

Aebi, V. et al., "EBAPS: Next Generation, Low Power, Digital Night Vision", Presented at the OPTRO 2005 International Symposium, May 10, 2005, pp. 1-10, Paris, France, in 10 pages.

(Continued)

*Primary Examiner* — Joshua E Freeman
(74) *Attorney, Agent, or Firm* — Knobbe, Martens, Olson & Bear, LLP

(57) ABSTRACT

A tactical rail for a firearm includes a rail body having a receiver end and a muzzle end, a non-contact optical connection, and a high speed data spoke. The non-contact optical connection is arranged at an end of the rail body and is configured to interface with a corresponding non-contact optical interface. The high speed data spoke is connected to the non-contact optical connection for high speed data communication through the non-contact optical connection and the corresponding non-contact optical interface. Tactical rail arrangements and firearm with tactical rails and tactical rail arrangements are also described.

34 Claims, 12 Drawing Sheets

(56) References Cited

U.S. PATENT DOCUMENTS

| | | |
|---|---|---|
| 4,601,540 A | 7/1986 | Karning et al. |
| 4,605,281 A | 8/1986 | Hellewell |
| 4,698,489 A | 10/1987 | Morley |
| 4,758,719 A | 7/1988 | Sasaki et al. |
| 4,786,966 A | 11/1988 | Hanson et al. |
| 4,792,206 A | 12/1988 | Skuratovsky |
| 4,840,451 A | 6/1989 | Sampson et al. |
| 5,005,213 A | 4/1991 | Hanson et al. |
| 5,035,472 A | 7/1991 | Hansen |
| 5,125,394 A | 6/1992 | Chatenever et al. |
| 5,128,807 A | 7/1992 | Blackmon |
| 5,140,151 A | 8/1992 | Weiner et al. |
| 5,303,606 A | 4/1994 | Kokinda |
| 5,303,688 A | 4/1994 | Chiuminatta et al. |
| 5,359,675 A | 10/1994 | Siwoff |
| 5,448,161 A | 9/1995 | Byerley, III et al. |
| 5,463,495 A | 10/1995 | Murg |
| 5,513,440 A | 5/1996 | Murg |
| 5,535,053 A | 7/1996 | Baril et al. |
| 5,584,137 A | 12/1996 | Teetzel |
| 5,651,081 A | 7/1997 | Blew et al. |
| 5,653,034 A | 8/1997 | Bindon |
| 5,668,904 A | 9/1997 | Sutherland et al. |
| 5,687,271 A | 11/1997 | Rabinowitz |
| 5,711,104 A | 1/1998 | Schmitz |
| 5,847,753 A | 12/1998 | Gabello et al. |
| 5,881,449 A | 3/1999 | Ghosh et al. |
| 5,903,996 A | 5/1999 | Morley |
| 5,946,132 A | 8/1999 | Phillips |
| 5,949,565 A | 9/1999 | Ishida |
| 5,953,761 A | 9/1999 | Jurga et al. |
| 5,956,444 A | 9/1999 | Duda et al. |
| 6,020,994 A | 2/2000 | Cook |
| 6,057,966 A | 5/2000 | Carroll et al. |
| 6,200,041 B1 | 3/2001 | Gaio et al. |
| 6,272,692 B1 | 8/2001 | Abraham |
| 6,311,576 B1 | 11/2001 | Pletschet |
| 6,327,381 B1 | 12/2001 | Rogina et al. |
| 6,369,941 B2 | 4/2002 | Zadravec |
| 6,381,081 B1 | 4/2002 | Ford |
| 6,404,961 B1 | 6/2002 | Bonja et al. |
| 6,456,497 B1 | 9/2002 | Palmer |
| 6,519,890 B1 | 2/2003 | Otterman |
| 6,560,029 B1 | 5/2003 | Dobbie et al. |
| 6,574,053 B1 | 6/2003 | Spinali |
| 6,615,531 B1 | 9/2003 | Holmberg |
| 6,690,866 B2 | 2/2004 | Bonja et al. |
| 6,714,708 B2 | 3/2004 | McAlpine et al. |
| 6,737,596 B1 | 5/2004 | Hein |
| 6,807,742 B2 | 10/2004 | Schick et al. |
| 6,898,192 B2 | 5/2005 | Chheda et al. |
| 6,901,221 B1 | 5/2005 | Jiang et al. |
| 7,016,579 B2 | 3/2006 | Militaru et al. |
| 7,062,796 B1 | 6/2006 | Dixon |
| D524,785 S | 7/2006 | Huang |
| 7,069,685 B2 | 7/2006 | Houde-Walter |
| 7,096,512 B2 | 8/2006 | Blair |
| 7,128,475 B2 | 10/2006 | Kesler |
| 7,132,648 B2 | 11/2006 | Ratiff et al. |
| 7,166,812 B2 | 1/2007 | White et al. |
| 7,171,776 B2 | 2/2007 | Staley, III |
| 7,194,012 B2 | 3/2007 | Mason et al. |
| 7,210,262 B2 | 5/2007 | Florence et al. |
| 7,210,392 B2 | 5/2007 | Greene et al. |
| 7,219,370 B1 | 5/2007 | Teetzel et al. |
| 7,278,734 B2 | 10/2007 | Jannard et al. |
| 7,292,262 B2 | 11/2007 | Towery et al. |
| 7,298,941 B2 | 11/2007 | Palen et al. |
| 7,319,557 B2 | 1/2008 | Tai |
| 7,369,302 B2 | 5/2008 | Gaber |
| 7,409,792 B2 | 8/2008 | Narcy et al. |
| 7,437,848 B2 | 10/2008 | Chang |
| 7,462,035 B2 | 12/2008 | Lee et al. |
| 7,488,294 B2 | 2/2009 | Torch |
| 7,552,559 B2 | 6/2009 | Day |
| 7,609,467 B2 | 10/2009 | Blanding et al. |
| 7,612,956 B2 | 11/2009 | Blanding et al. |
| 7,627,975 B1 | 12/2009 | Hines |
| 7,649,550 B2 | 1/2010 | Ishiyama et al. |
| 7,676,137 B2 | 3/2010 | Schick et al. |
| 7,690,849 B2 | 4/2010 | Scharf et al. |
| 7,701,493 B2 | 4/2010 | Mauritzson |
| 7,705,855 B2 | 4/2010 | Brown Elliott |
| 7,710,654 B2 | 5/2010 | Ashkenazi et al. |
| 7,730,820 B2 | 6/2010 | Vice et al. |
| 7,740,499 B1 | 6/2010 | Willey et al. |
| 7,744,286 B2 | 6/2010 | Lu et al. |
| 7,787,012 B2 | 8/2010 | Scales et al. |
| 7,795,574 B2 | 9/2010 | Kennedy et al. |
| 7,800,852 B2 | 9/2010 | Blanding et al. |
| 7,827,723 B1 | 11/2010 | Zaderey et al. |
| 7,832,023 B2 | 11/2010 | Crisco |
| 7,842,922 B2 | 11/2010 | Leneke et al. |
| 7,899,332 B2 | 3/2011 | Shindou et al. |
| 7,911,687 B2 | 3/2011 | Scholz |
| 7,916,156 B2 | 3/2011 | Brown Elliott et al. |
| 7,933,464 B2 | 4/2011 | Zhang et al. |
| 7,952,059 B2 | 5/2011 | Vitale et al. |
| 7,972,067 B2 | 7/2011 | Haley et al. |
| 7,990,523 B2 | 8/2011 | Schlierbach et al. |
| 8,014,679 B2 | 9/2011 | Yamazaki |
| 8,063,934 B2 | 11/2011 | Donato |
| 8,067,735 B2 | 11/2011 | King et al. |
| 8,082,688 B2 | 12/2011 | Elpedes et al. |
| 8,085,482 B2 | 12/2011 | Frankovich et al. |
| 8,093,992 B2 | 1/2012 | Jancic et al. |
| 8,112,185 B2 | 2/2012 | Wu |
| 8,153,975 B2 | 4/2012 | Hollander et al. |
| 8,225,542 B2 | 7/2012 | Houde-Walter |
| 8,253,105 B1 | 8/2012 | Warnke et al. |
| 8,312,667 B2 | 11/2012 | Thomas et al. |
| 8,336,776 B2 | 12/2012 | Horvath et al. |
| 8,337,036 B2 | 12/2012 | Soto et al. |
| 8,350,796 B2 | 1/2013 | Tomizawa et al. |
| 8,375,620 B2 | 2/2013 | Staley, III |
| D677,298 S | 3/2013 | Hallgren |
| 8,411,346 B2 | 4/2013 | Sapir |
| 8,488,969 B1* | 7/2013 | Masarik ................. H04B 10/22 398/113 |
| 8,531,592 B2 | 9/2013 | Teetzel et al. |
| 8,532,490 B2 | 9/2013 | Smith et al. |
| 8,656,628 B2 | 2/2014 | Jock et al. |
| 8,717,392 B2 | 5/2014 | Levola |
| 8,773,766 B2 | 7/2014 | Jannard et al. |
| 8,776,422 B2 | 7/2014 | Dodd et al. |
| 8,781,273 B2 | 7/2014 | Benjamin et al. |
| 8,826,583 B2 | 9/2014 | Kepler et al. |
| 8,849,379 B2 | 9/2014 | Abreu |
| 8,886,046 B2 | 11/2014 | Masarik |
| 8,908,045 B2 | 12/2014 | Stewart |
| 8,923,703 B2 | 12/2014 | Masarik |
| 8,928,878 B2 | 1/2015 | Jaeschke et al. |
| 8,942,632 B2 | 1/2015 | Shen |
| 8,963,573 B2 | 2/2015 | Achkir et al. |
| 9,042,736 B2 | 5/2015 | Masarik |
| 9,052,153 B2 | 6/2015 | Oh et al. |
| 9,057,583 B2 | 6/2015 | Matthews et al. |
| 9,069,001 B2 | 6/2015 | Braman et al. |
| 9,093,231 B2 | 7/2015 | Fujita et al. |
| 9,113,061 B1 | 8/2015 | Morley |
| 9,225,419 B2 | 12/2015 | Masarik |
| 9,310,163 B2 | 4/2016 | Bay |
| 9,316,462 B2 | 4/2016 | Varshneya |
| 9,319,143 B2 | 4/2016 | El-Ahmadi et al. |
| 9,335,122 B2 | 5/2016 | Choiniere |
| 9,366,504 B2 | 6/2016 | Hester et al. |
| 9,373,277 B2 | 6/2016 | Sagan |
| 9,389,677 B2 | 7/2016 | Hobby et al. |
| 9,429,391 B2 | 8/2016 | Walker |
| 9,438,774 B2 | 9/2016 | Masarik |
| 9,466,120 B2 | 10/2016 | Maryfield et al. |
| 9,506,725 B2 | 11/2016 | Maryfield et al. |
| 9,516,202 B2 | 12/2016 | Masarik et al. |
| 9,593,913 B1 | 3/2017 | Wright et al. |

(56) References Cited

U.S. PATENT DOCUMENTS

| | | |
|---|---|---|
| 9,615,004 B2 | 4/2017 | Masarik |
| 9,622,529 B2 | 4/2017 | Teetzel et al. |
| 9,658,423 B2 | 5/2017 | Gustafson et al. |
| 9,696,111 B2 | 7/2017 | Saadon |
| 9,705,605 B2 | 7/2017 | Masarik |
| 9,769,902 B1 | 9/2017 | Cain et al. |
| 9,823,043 B2 | 11/2017 | Compton et al. |
| 9,861,263 B2 | 1/2018 | Kwan et al. |
| 9,897,411 B2 | 2/2018 | Compton et al. |
| 9,910,259 B2 | 3/2018 | Armbruster et al. |
| 9,921,028 B2 | 3/2018 | Compton et al. |
| 9,934,739 B2 | 4/2018 | Hogan |
| 9,948,878 B2 | 4/2018 | Simolon et al. |
| 9,995,901 B2 | 6/2018 | Petersen |
| 10,003,756 B2 | 6/2018 | Masarik et al. |
| 10,024,631 B2 | 7/2018 | Portoghese et al. |
| 10,036,869 B2 | 7/2018 | Fahr et al. |
| 10,095,089 B2 | 10/2018 | Po et al. |
| 10,113,837 B2 | 10/2018 | Masarik et al. |
| 10,190,848 B2 | 1/2019 | VanBecelaere |
| 10,309,749 B2 | 6/2019 | Hamilton |
| 10,379,135 B2 | 8/2019 | Maryfield et al. |
| 10,584,941 B2 | 3/2020 | Masarik et al. |
| 2002/0027690 A1 | 3/2002 | Bartur et al. |
| 2004/0031184 A1 | 2/2004 | Hope |
| 2005/0058444 A1 | 3/2005 | Watanabe et al. |
| 2005/0114710 A1 | 5/2005 | Cornell et al. |
| 2005/0225575 A1 | 10/2005 | Brown Elliott et al. |
| 2005/0232512 A1 | 10/2005 | Luk et al. |
| 2005/0254126 A1 | 11/2005 | Lin et al. |
| 2005/0268519 A1 | 12/2005 | Pikielny |
| 2006/0165413 A1 | 7/2006 | Schemmann et al. |
| 2007/0003562 A1 | 1/2007 | Druilhe |
| 2007/0035626 A1 | 2/2007 | Randall et al. |
| 2007/0213586 A1 | 9/2007 | Hirose et al. |
| 2007/0257944 A1 | 11/2007 | Miller et al. |
| 2008/0263752 A1 | 10/2008 | Solinsky et al. |
| 2008/0309586 A1 | 12/2008 | Vitale |
| 2008/0317474 A1 | 12/2008 | Wang et al. |
| 2009/0052023 A1 | 2/2009 | Winker et al. |
| 2009/0111454 A1* | 4/2009 | Jancic ..................... F41G 1/35 455/420 |
| 2009/0181729 A1 | 7/2009 | Griffin, Jr. et al. |
| 2010/0027943 A1 | 2/2010 | Armani et al. |
| 2010/0149073 A1 | 6/2010 | Chaum et al. |
| 2010/0225673 A1 | 9/2010 | Miller et al. |
| 2010/0266245 A1 | 10/2010 | Sabo |
| 2010/0308999 A1 | 12/2010 | Chornenky |
| 2010/0328420 A1 | 12/2010 | Roman |
| 2011/0030264 A1 | 2/2011 | Davidson et al. |
| 2011/0041377 A1 | 2/2011 | Thomas et al. |
| 2011/0067288 A1 | 3/2011 | Hakansson et al. |
| 2011/0145981 A1 | 6/2011 | Teetzel |
| 2011/0187563 A1 | 8/2011 | Sanders-Reed |
| 2011/0213664 A1 | 9/2011 | Osterhout et al. |
| 2011/0214082 A1 | 9/2011 | Osterhout et al. |
| 2011/0239354 A1 | 10/2011 | Celona et al. |
| 2012/0030985 A1 | 2/2012 | Mauricio et al. |
| 2012/0033195 A1 | 2/2012 | Tai |
| 2012/0097741 A1 | 4/2012 | Karcher |
| 2012/0159833 A1 | 6/2012 | Hakanson et al. |
| 2012/0182417 A1 | 7/2012 | Everett |
| 2012/0182610 A1 | 7/2012 | O'Hara et al. |
| 2012/0192476 A1 | 8/2012 | Compton et al. |
| 2012/0212414 A1 | 8/2012 | Osterhout et al. |
| 2012/0238208 A1 | 9/2012 | Bienas et al. |
| 2012/0255213 A1 | 10/2012 | Panos |
| 2012/0311910 A1 | 12/2012 | Mironichev et al. |
| 2012/0317706 A1 | 12/2012 | Lebel et al. |
| 2012/0320340 A1 | 12/2012 | Coleman, III |
| 2012/0327247 A1 | 12/2012 | Mironichev et al. |
| 2013/0016215 A1 | 1/2013 | Bitar et al. |
| 2013/0033746 A1 | 2/2013 | Brumfield |
| 2013/0036646 A1 | 2/2013 | Rubac et al. |
| 2013/0072120 A1 | 3/2013 | Wu |
| 2013/0088604 A1 | 4/2013 | Hamrelius et al. |
| 2013/0167425 A1 | 7/2013 | Crispin |
| 2013/0188943 A1 | 7/2013 | Wu |
| 2013/0215395 A1 | 8/2013 | Li |
| 2014/0007485 A1 | 1/2014 | Castejon, Sr. |
| 2014/0047754 A1 | 2/2014 | Compton et al. |
| 2014/0104449 A1 | 4/2014 | Masarik et al. |
| 2014/0260748 A1 | 9/2014 | Traver |
| 2014/0270800 A1* | 9/2014 | Masarik ................ F16M 13/04 398/131 |
| 2014/0285882 A1 | 9/2014 | Gotz et al. |
| 2015/0016817 A1 | 1/2015 | Hara et al. |
| 2015/0020427 A1* | 1/2015 | Compton ................ F41C 27/00 42/71.01 |
| 2015/0101234 A1 | 4/2015 | Priest et al. |
| 2015/0226613 A1 | 8/2015 | Bauer et al. |
| 2015/0282549 A1 | 10/2015 | Lebel et al. |
| 2015/0316351 A1 | 11/2015 | Choiniere |
| 2015/0375865 A1 | 12/2015 | Fischer et al. |
| 2016/0028970 A1 | 1/2016 | Masarik et al. |
| 2016/0033234 A1 | 2/2016 | Swift et al. |
| 2016/0191172 A1* | 6/2016 | Masarik ................... H05K 7/02 361/679.01 |
| 2016/0327365 A1 | 11/2016 | Collin et al. |
| 2017/0010073 A1* | 1/2017 | Downing ................ F41C 27/00 |
| 2017/0078022 A1 | 3/2017 | Masarik et al. |
| 2017/0122706 A1* | 5/2017 | Masarik ................ F41G 11/003 |
| 2017/0153713 A1 | 6/2017 | Niinuma et al. |
| 2017/0237919 A1 | 8/2017 | Lamesch |
| 2017/0302386 A1 | 10/2017 | Masarik |
| 2018/0106568 A1* | 4/2018 | Hedeen ................ H04N 5/2257 |
| 2018/0232952 A1 | 8/2018 | Hiranandani et al. |
| 2018/0246135 A1 | 8/2018 | Pan et al. |
| 2018/0302576 A1 | 10/2018 | Masarik et al. |
| 2019/0094981 A1 | 3/2019 | Bradski et al. |
| 2019/0166174 A1 | 5/2019 | Moseman |
| 2019/0222771 A1* | 7/2019 | Hedeen ..................... F41J 5/10 |
| 2019/0353461 A1 | 11/2019 | Neal et al. |
| 2020/0014887 A1 | 1/2020 | Moseman et al. |
| 2020/0051481 A1 | 2/2020 | Masarik et al. |
| 2020/0053303 A1 | 2/2020 | Vaklev et al. |
| 2020/0081242 A1 | 3/2020 | Kuczek et al. |

FOREIGN PATENT DOCUMENTS

| | | |
|---|---|---|
| CN | 204944509 | 1/2016 |
| CN | 106612141 | 5/2017 |
| EP | 0 176 169 | 4/1986 |
| EP | 2 722 632 | 4/2014 |
| EP | 2 812 749 | 12/2014 |
| EP | 3 172 524 | 5/2017 |
| EP | 3 205 974 | 8/2017 |
| EP | 3 239 754 | 11/2017 |
| GB | 2162654 | 2/1986 |
| JP | H07-295682 | 11/1995 |
| WO | WO 2005/121688 | 12/2005 |
| WO | WO 2013/080058 | 6/2013 |
| WO | WO 2013/102869 | 7/2013 |
| WO | WO 2013/119983 | 8/2013 |
| WO | WO 2014/062725 | 4/2014 |
| WO | WO 2014/150076 | 9/2014 |
| WO | WO 2016/014655 | 1/2016 |
| WO | WO 2019/222422 | 11/2019 |
| WO | WO 2019/222426 | 11/2019 |
| WO | WO 2020/051464 | 3/2020 |

OTHER PUBLICATIONS

Ackerman, S., "It Only Took the Army 16 Years and 2 Wars to Deploy this Network",Wired.com, Jun. 28, 2012, in 7 pages. URL: http://www.wired.com/dangerrom/2012/06/army-data-network-war/all/.

Armstrong, S. C., "Project Manager Soldier Weapons Program Overview NDIA", May 15, 2012, in 38 pages.

Schott—Glass Made of Ideas, GBPS-MC-GOF-Demo, dated Jan. 2006, pp. S.1-S.8, in 8 pages.

(56) References Cited

OTHER PUBLICATIONS

Sklarek, W., "High Data Rate Capabilities of Multicore Glass Optical Fiber Cables, 22 FGT 'Otische Polymerfasern'", dated Oct. 25, 2006, in 19 pages. URL: http://www.pofac.de/downloads/itgfg/fgt2.2/FGT2.2_Munchen_Sklarek_GOF-Buendel.
Tao, R. et al., "10 Gb/s CMOS Limiting Amplifier for Optical links", Proceedings of the 29th European Solid-State Circuits Conference, Sep. 16-18, 2013, pp. 285-287, Estoril, Portugal, in 3 pages.
Zhu, Z. et al., "AR-Weapon: Live Augmented Reality Based First-Person Shooting System", 2015 IEEE Winter Conference on Applications of Computer Vision, Feb. 2015, in 8 pages.
PCT Application No. PCT/US2019/032526 International Search Report and Written Opinion dated Aug. 1, 2019, in 14 pages.
PCT Application No. PCT/US2019/032520 International Search Report and Written Opinion dated Aug. 1, 2019, in 14 pages.

\* cited by examiner

TACTICAL RAILS, TACTICAL RAIL SYSTEMS, AND FIREARM ASSEMBLIES HAVING TACTICAL RAILS

BACKGROUND OF THE INVENTION

1. Field of the Invention

The present disclosure relates to firearms, and more particularly to tactical rails for removably fixing accessories to firearms.

2. Description of Related Art

Firearms, such as assault rifles, commonly include accessory rails. Accessory rails generally conform to a rail standard, for example, MIL-STD-1913, Weaver, NATO STANAG 4694 accessory rails, and are designed to allow a user to attach and detach various accessories to firearms. Firearms fitted with accessory rails in turn can be readily kitted with various accessories that conform to the particular accessory rail standard, such as with telescopic sights, tactical sights, laser sighting modules, night vision devices, and range finders, thereby enhancing or provide additional capability to the firearm. In some cases a user can add accessories to the firearm using an accessory rail without specialized tools or training.

Some firearm accessories require electrical power and/or connectivity for data communication. To accommodate the need for electrical power some accessory rails include power distribution capability for providing electrical power to accessories through the accessory rail. To accommodate the need for connectivity some accessory rails include integral data links. Integral data links are generally limited to low speed data communication, accessories requiring high speed data connectivity typically provisioned with coaxial cables or wireless transceivers to provide additional bandwidth for higher data rates of data communication.

Such conventional methods and systems have generally been considered satisfactory for their intended purpose. However, there is still a need in the art for improved tactical rails and tactical rail arrangements. The present disclosure provides a solution for this need.

SUMMARY OF THE INVENTION

A tactical rail for a firearm includes a rail body having a receiver end and a muzzle end, a non-contact optical connection, and a high speed data spoke. The non-contact optical connection is arranged at an end of the rail body and is configured to interface with a corresponding non-contact optical interface. The high speed data spoke is connected to the non-contact optical connection for high speed data communication with a high speed data accessory through the non-contact optical connection and the corresponding non-contact optical interface.

In certain embodiments the rail body can be interchangeable with a handguard for a firearm. The rail body can be configured for fixation to a firearm as an upper tactical rail, a right-hand tactical rail, or a left-hand tactical rail. The rail body can have ribs and slots axially spaced along the rail body between the receiver end and the muzzle end of the rail body. The rail body can conform to a Weaver, Warsaw Pact, KeyMod, M-LOK, or MIL-STD-1913 rail standard.

In accordance with certain embodiments, the non-contact optical connection can be arranged at the receiver end of the rail body. The non-contact optical connection can be arranged at the muzzle end of the rail body. The high speed data spoke can be a rail spoke extending from the receiver end of the rail body to the muzzle end of the rail body. The high speed data spoke can be a crossover spoke configured to connect with a non-contact optical connection of another tactical rail. The high speed data spoke can include an optical waveguide, such as a fiber optic or fiber optic bundle, a glass light pipe, or a plastic light pipe.

In accordance with further embodiments, the non-contact optical connection can be a receiver end non-contact optical connection arranged at the receiver end of the rail body. A muzzle end non-contact optical connection can be arranged at the muzzle end of the rail body. The high speed data spoke can connect the muzzle end non-contact optical connection with the receiver end non-contact optical connection. The crossover spoke can be connected to the muzzle end of the rail body to connect with a non-contact optical connection of another tactical rail. The crossover spoke can be connected to the receiver end of the rail body to connect with a non-contact optical connection of another tactical rail.

It is contemplated that the non-contact optical connection can be a first receiver end non-contact optical connection and a second receiver end non-contact optical connection can be arranged at the receiver end of the rail body. The high speed data spoke can include a crossover spoke connected to the second receiver end non-contact optical connection, the crossover spoke configured to connect with a non-contact optical connection of another tactical rail. A third receiver end non-contact optical connection can be arranged at the receiver end of the rail body and adjacent to the second receiver end non-contact optical connection. A crossover spoke can be connected to the third receiver end non-contact optical connection, the crossover spoke also configured to connect with a non-contact optical connection of still another tactical rail.

It is also contemplated that the rail body can include a power bus. The power bus can include a contact electrical connection co-located with the non-contact optical connection. The power bus can include a rail segment. The rail segment can extend between the muzzle end of the rail body and the receiver end of the rail body. The power bus can include a crossover segment. The crossover segment can be configured to electrically connect to a rail segment of another tactical rail.

In further embodiments a high speed data accessory can be removably fixed to the tactical rail and in optical communication with the non-contact optical connection. The high speed data accessory can be a first high speed data accessory and a second high speed data accessory can be in high speed data communication with the first high speed data accessory through the high speed data spoke. The first high speed data accessory and the second high speed data accessory can be removably fixed to a common tactical rail. The second high speed data accessory can be removably fixed to another tactical rail.

In still further embodiments the tactical rail can include an accessory detector. The accessory detector can be co-located with the non-contact optical connection. The accessory detector can include a hall-effect sensor, a pressure sensor, or a proximity sensor. The accessory detector can have an accessory-detected state and an no accessory-detected state. The accessory detector can be configured to prevent optical communication through non-contact optical connection in the no accessory-detected state. The accessory detector can be configured to allow optical communication through the high speed data spoke in the accessory-detected state. State change of the accessory detector can trigger or cease optical communication.

A tactical rail arrangement includes an upper tactical rail and at least one of a right tactical rail and a left tactical rail as described above. The non-contact optical connection of the upper tactical rail is arranged at the muzzle end of the tactical rail and first and second receiver end non-contact optical connections are arranged at the receiver end of the upper tactical rail. The high speed data spoke of the upper tactical rail is a rail spoke that optically couples the muzzle end non-contact optical connection with the first receiver end non-contact optical connection. The high speed data spoke of the at least one of right and left tactical rails optically couples the non-contact optical connection of the right or left tactical rail to the second receiver end non-contact optical connection of the upper tactical rail. In certain embodiments the right or left tactical rail high speed data spoke can be a rail spoke. In accordance with certain embodiment the right or left high speed data spoke can be a crossover spoke.

A firearm assembly includes a firearm having a muzzle and a receiver and a tactical rail as described above. The tactical rails is fixed to the firearm between the muzzle and the receiver of the firearm. The non-contact optical connection is arranged at the receiver end of the tactical rail, the tactical rail having a muzzle end non-contact optical connection arranged at the muzzle end of the rail body. The high speed data spoke connects the muzzle end non-contact optical connection with the receiver end non-contact optical connection. A high speed data accessory is removably fixed on the receiver end of the tactical rail and is in optical communication with the muzzle end non-contact optical connection through the receiver end non-contact optical connection and the high speed data spoke.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
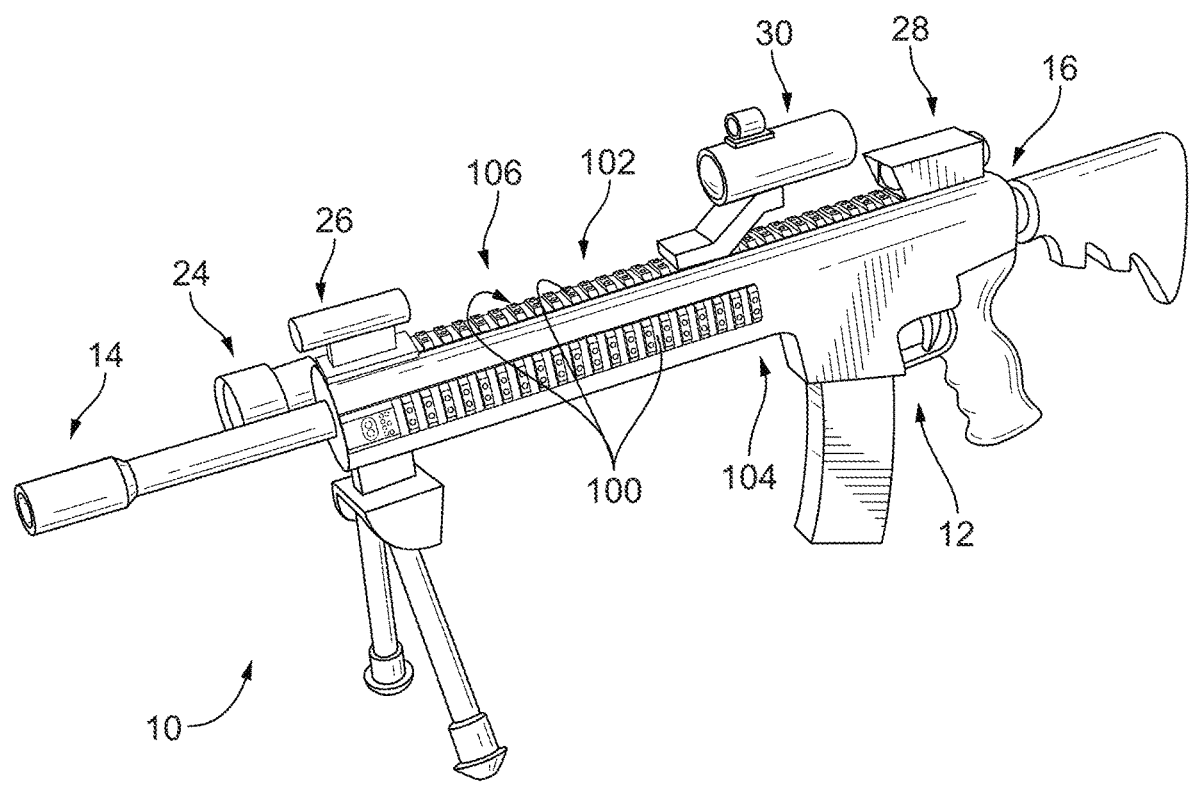
FIG. 1 is a perspective view of an exemplary embodiment of a firearm assembly, showing a tactical rail arrangement and accessories removably fixed to the firearm by the tactical rail arrangement, the accessories requiring power and connectivity for data communications.

Reference will now be made to the drawings wherein like reference numerals identify similar structural features or aspects of the subject disclosure. For purposes of explanation and illustration, and not limitation, a partial view of an exemplary embodiment of a tactical rail arrangement in accordance with the disclosure is shown in FIG. 1 and is designated generally by reference character 100. Other embodiments of tactical rails, tactical rail arrangements, and firearm assemblies having tactical rails and tactical rail arrangements in accordance with the disclosure, or aspects thereof, are provided in FIGS. 2-17, as will be described. The systems and methods described herein can be used for providing connectivity for high speed data communication to firearm accessories, such as for imaging or video accessories, though the present disclosure is not limited to accessories requiring connectivity for high speed data communication in general.

Referring to FIG. 1, a firearm assembly 10 is shown. Firearm assembly 10 includes a firearm 12. Firearm 12 includes standard components such as a receiver, a grip, a barrel, a handguard 30 (shown in FIG. 9), and a butt stock, a muzzle 14 and a receiver 16. Muzzle 14 and receiver 16 are arranged at opposite ends of firearm 12. Tactical rail arrangement 100 includes at least a first tactical rail and a second tactical rail, e.g., two or more of an upper tactical rail 102, a left-hand (left) tactical rail 104, and a right-hand (right) tactical rail 106, each of which are configured for attachment to firearm 12. It is contemplated that one or more of the tactical rails be interchangeable with a handguard of firearm 12, e.g., handguard 32.

One or more high speed data accessories, e.g., accessories 24-30, are removably fixed to tactical rail arrangement 100. As shown in FIG. 1, tactical rail arrangement 100 removably fixes each of an illuminator accessory 24, a camera accessory 26, a user interface accessory 28, and a telescopic sight accessory 30 to firearm 12 to integrate each with firearm 12 to form firearm assembly 10. It is contemplated that firearm assembly 10 include fewer than four (4) or more than four (4) accessories, as suitable for an intended application. In certain embodiments accessory 30 can be a low speed data accessory, such a legacy device requiring a data rate below 200 megabits per second by way of example.

As will be appreciated by those of skill in the art in view of the present disclosure, some firearm accessories require electrical power and/or connectivity for data communications. In this respect connectivity can be necessary for low speed data communication, e.g., data rates of about 200 megabits per second and slower. Connectivity can also be necessary for high speed data communication, e.g., data rates of about one gigabyte per second and higher. To accommodate the requirements for electrical power and connectivity tactical rail arrangement 100 includes a power bus 50 (shown in FIG. 2) to provide electrical power to accessories 24-30, a low speed data bus 52 (shown in FIG. 3) with a bus topology 59 (shown in FIG. 3) to provide connectivity for low speed data communication to one or more of accessories 24-30, and a high speed data bus 54 (shown in FIG. 5) to provide connectivity for high speed data communication to one or more of accessories 24-30. In certain embodiments tactical rail arrangement 100 can include a hybrid data bus 74 (shown in FIG. 8) to provide connectivity for both low speed communication and high speed data communication between accessories removably fixed to tactical rail arrangement 100.

Figure 2:
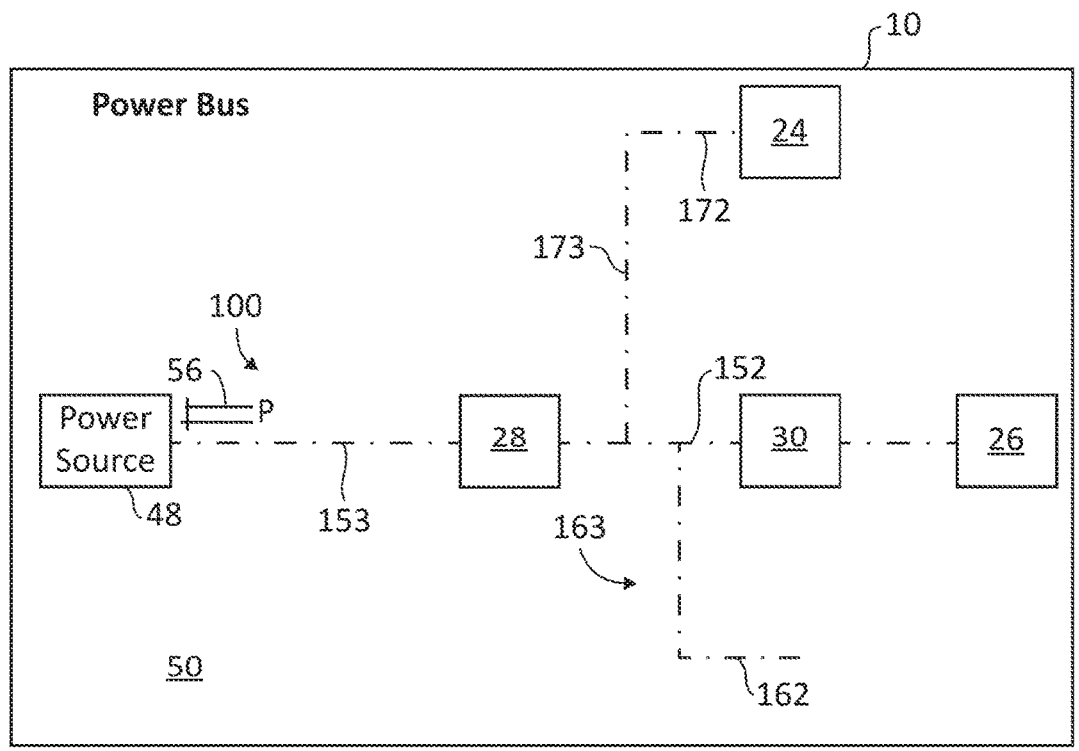
FIG. 2 is a schematic diagram of a power bus routed through the tactical rail arrangement of FIG. 1, showing the power bus topology and accessories powered by the power bus.

With reference to FIG. 2, power bus 50 is shown. Power bus 50 is configured to provide electrical communication between a power source 48 and accessories 24-30 removably fixed to firearm 12 by tactical rail arrangement 100. In this respect power bus 50 includes an upper rail bus segment 152, a left rail bus segment 162, and a right rail bus segment 172. Power bus 50 also includes an upper rail power lead 153, a left rail crossover segment 163, and a right rail crossover segment 173.

Upper rail bus segment 152 is fixed within upper tactical rail 102 (shown in FIG. 1). Left rail bus segment 162 and right rail bus segment 172 are fixed within left tactical rail 104 (shown in FIG. 1) and right tactical rail 106 (shown in FIG. 1), respectively. Left rail crossover segment 163 connects left rail bus segment 162 with upper rail bus segment 152. Right rail crossover segment 173 connects right rail bus segment 172 with upper rail bus segment 152. Upper rail power lead 153 connects a power source 48 to power bus 50, thereby providing DC power 56 to upper rail bus segment 152, left rail bus segment 162, and right rail bus segment 172 through left rail crossover segment 163 and right rail crossover segment 173.

Accessories 24-30 are electrically connected to the rail bus segments. In the illustrated exemplary arrangement accessory 24 is electrically connected to right rail bus segment 172. Accessory 26, accessory 30, and user interface accessory 28 are each electrically connected to upper rail bus segment 152. Power source 48 can be a remote power source, e.g., not carried by firearm assembly 12, such as a battery, and can be arranged within the stock of firearm 12.

Figure 3:
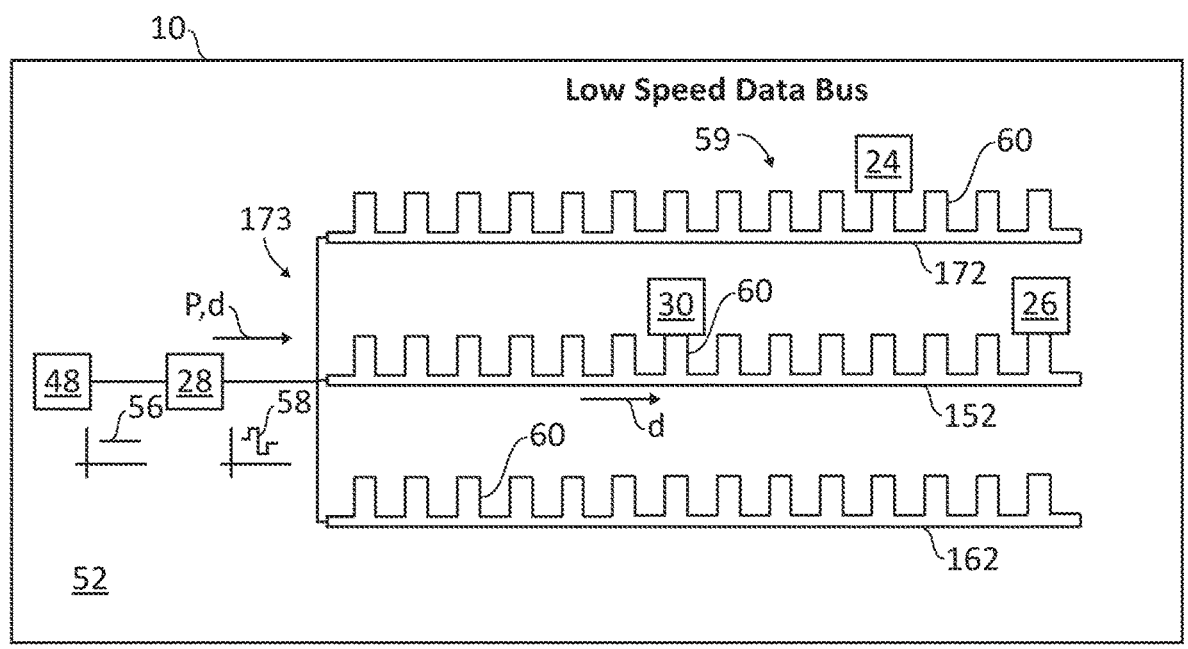
FIG. 3 is a schematic diagram of a low speed data bus routed through the tactical rail arrangement of FIG. 1, showing the low speed data bus topology and accessories having low speed data connectivity with one another through the low speed data bus.

With reference to FIG. 3, low speed data bus 52 is shown. Low speed data bus 52 has a bus topology 59 and is implemented using the bus segments of power bus 50 (shown in FIG. 2). In this respect bus topology 59 includes upper rail bus segment 152, left rail bus segment 162, and right rail bus segment 172. Bus topology 59 also includes left rail bus crossover segment 163 and right rail bus crossover segment 173 which, in cooperation with upper rail bus segment 152, left rail bus segment 162, and right rail bus segment 172, define low speed data bus 52.

Figure 4:
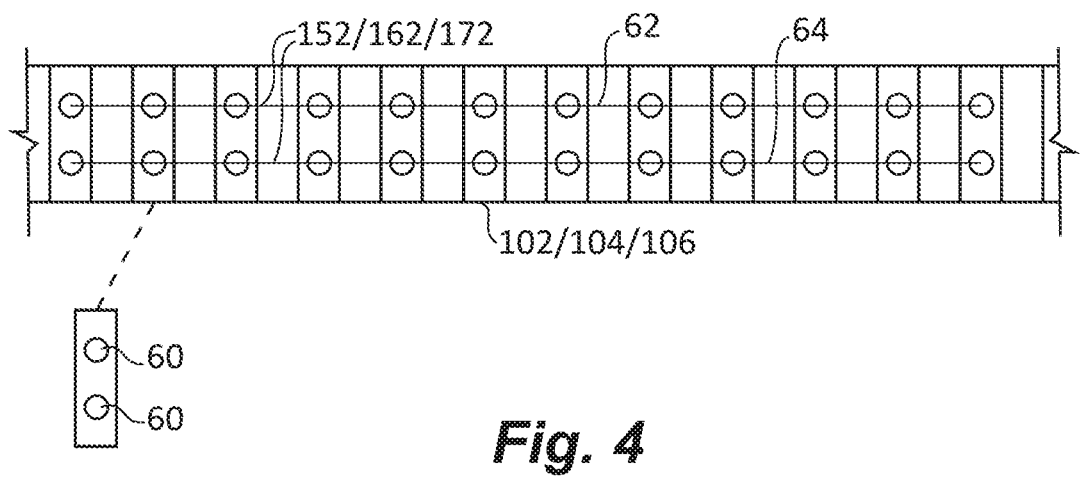
FIG. 4 is a schematic view of a portion of a tactical rail of the tactical rail arrangement of FIG. 1, showing a rail portion with contact electrical connections for connecting accessories to the power bus for powering and providing low speed data communication to the accessories.

Exemplary portions of rails 102/104/106 having bus segments 152/162/172 are shown in FIG. 4, rail bus segments 152/162/172 including electrical conductors 62/64 electrically connecting contact electrical connections 60 in series with one another to provide power and connectivity for low speed data communication d. Contact electrical connections 60 can be pogo pad-type electrical connections 61 having positive and negative pads located at a common axial location between the muzzle end and the receiver end of the respective tactical rail.

To provide connectivity for low speed data communication over low speed data bus 52 a power modulation method is employed. In this regard user interface accessory 28 receives constant frequency power 56 from power source 48, modulates constant frequency power 56 to include data, and provides the power as modulated power 58 to accessories removably fixed to tactical rail arrangement 100 through low speed data bus 52. Low speed data bus conveys 52 conveys modulated power to the accessories, thereby broadcasting data for addressed for individual accessories to each accessory removably fixed to tactical rail arrangement 100 as low speed data d in conjunction with power P. Examples of systems and methods of low speed data communication include Intelligent Rail® data rail systems, available from T-Worx Holdings LLC of Ashburn, Va.

While generally acceptable for their intended purpose, i.e., low speed data with data rates generally less than 200 megabytes per second, higher data rates can require relatively complex electronics for signal processing. To avoid the need for such electronics and provide high data rate communication suitable for imaging and/or video accessories, tactical rail arrangement 100 includes high speed data bus 54.

Figure 5:
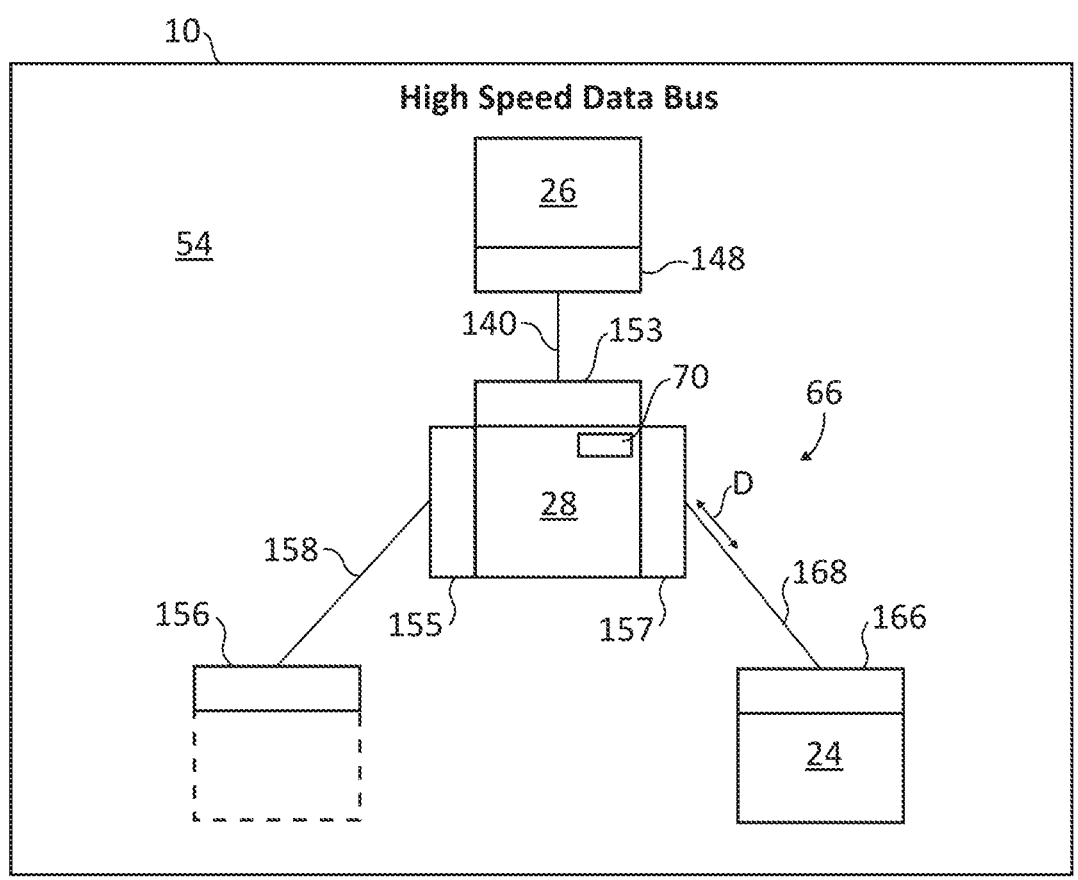
FIG. 5 is a schematic diagram of a high speed data bus routed through the tactical rail arrangement shown in FIG. 1, showing the high speed data bus topology and accessories having high speed data connectivity with one another through the high speed data bus.

Referring to FIG. 5, high speed data bus 54 is shown. High speed data bus 54 includes a star topology 66 to provide connectivity to high speed data accessories removably fixed to tactical rail arrangement 100 (shown in FIG. 1). In this respect high speed data bus 54 includes an upper spoke 140, a left spoke 158, and a right spoke 168, each of which can include a crossover spoke and/or a rail spoke according to arrangement of the particular tactical rail. High speed data bus 54 also includes a right rail non-contact optical connection 166, a left rail non-contact optical connection 156, and a hot shoe 151 (shown in FIG. 6). Hot shoe 151 in turn has first receiver end non-contact optical connection 153, a second receiver end non-contact optical connection 155, and a third receiver end non-contact optical connection 157. Examples of suitable non-contact optical connections include those described in U.S. Patent Application Publication No. 2017/0122706 A1 to Masarik et al., filed on Nov. 2, 2016, the contents of which are incorporated herein by reference in its entirety.

Upper spoke 140 is fixed to upper tactical rail 102 (shown in FIG. 1) and connects first receiver end non-contact optical connection 153 with a muzzle end non-contact optical connection 148. Left spoke 158 is fixed to left tactical rail 104 (shown in FIG. 1) and connects second receiver end non-contact optical connection 155 with left rail non-contact optical connection 156. Right spoke 168 is fixed to right tactical rail 106 (shown in FIG. 1) and connects third receiver end non-contact optical connection 157 with right rail non-contact optical connection 166.

Figure 6:
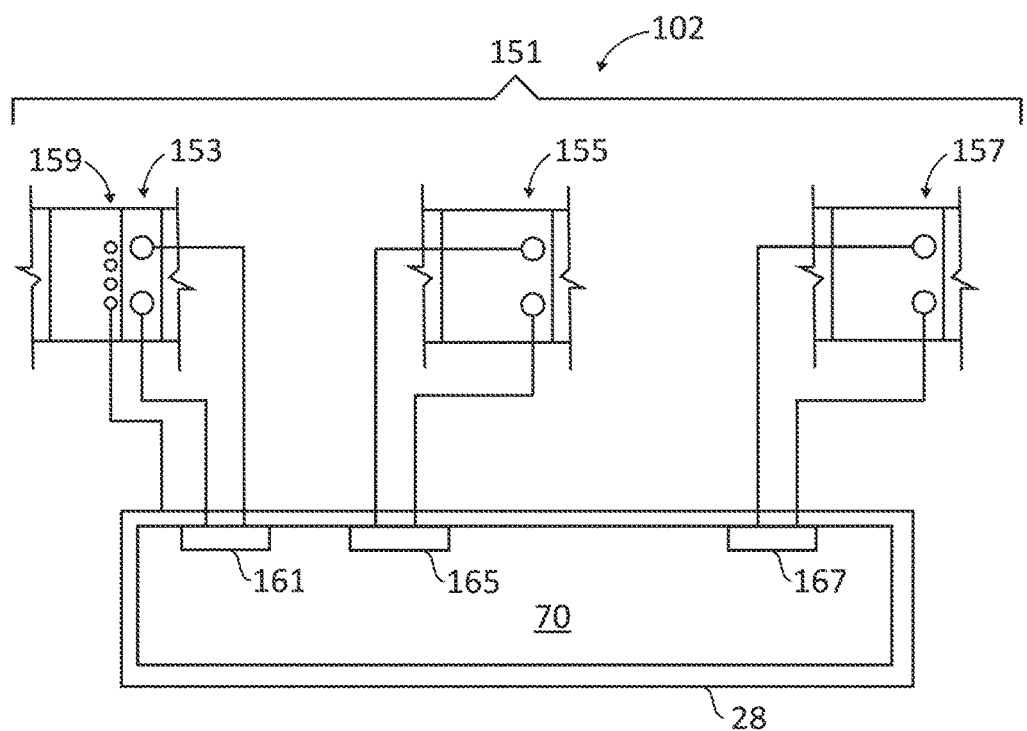
FIG. 6 is a schematic view of a portion of a tactical rail of the tactical rail arrangement of FIG. 1, showing a rail portion including a hot shoe to provide optical communication and electrical communication to a user interface accessory serving as the hub for the high speed data and the low speed data bus.

User interface accessory 28 includes an optical switch 70 and is removably fixed at hot shoe 151 (shown in FIG. 6). Hot shoe 151 provides optical communication to user interface accessory 28 through first receiver end non-contact optical connection 153, second receiver end non-contact optical connection 155, and third receiver end non-contact optical connection 157. Optical switch 70, contained within user interface accessory 28, routes high speed data D between accessories removably fixed to rail arrangement 100 (shown in FIG. 1) and in optical communication with one another through non-contact optical connections arranged on hot shoe 151, the muzzle end of upper tactical rail 102 (shown in FIG. 1), and arranged on the receiver end or muzzle end of left tactical rail 104 (shown in FIG. 1) and/or right tactical rail 106 (shown in FIG. 1).

Figure 7:
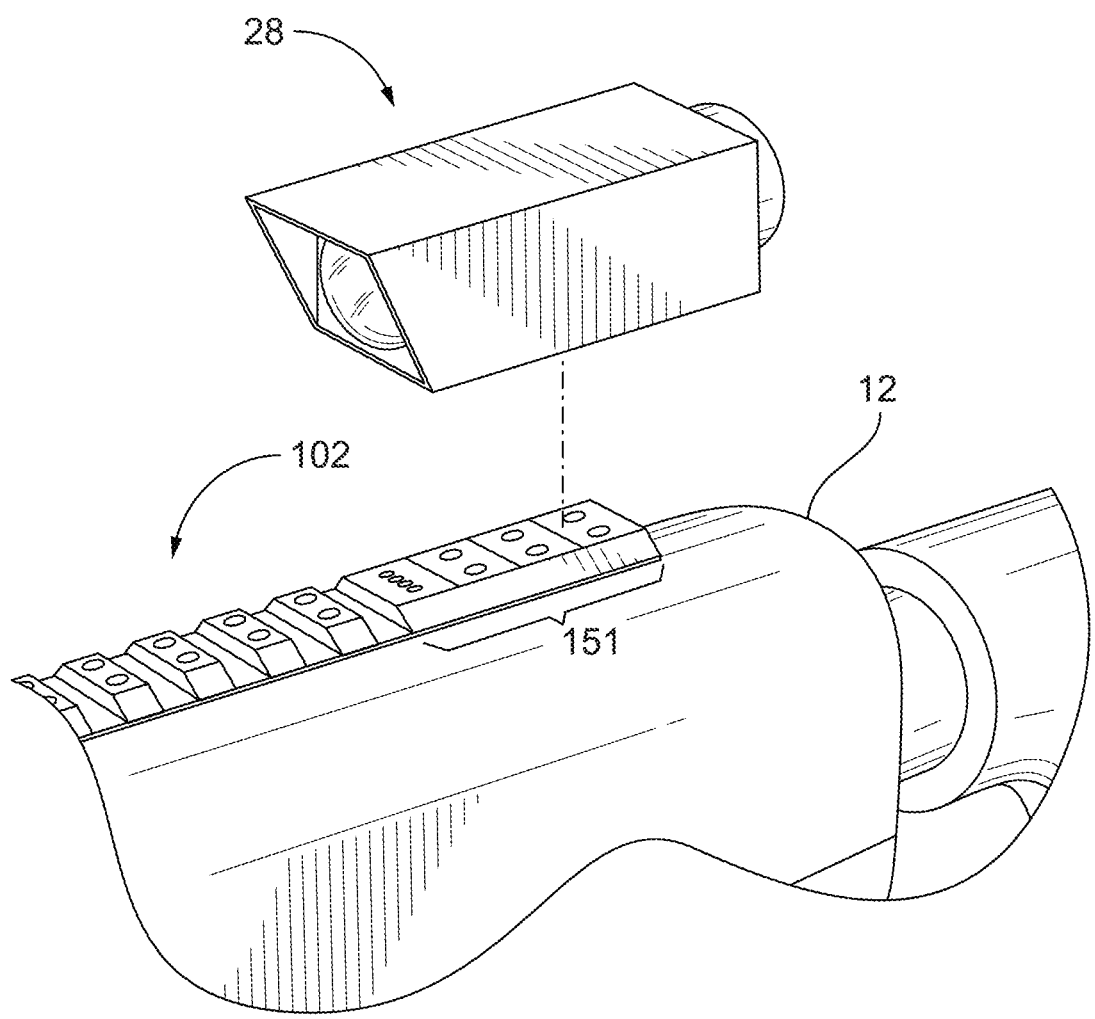
FIG. 7 is a side elevation view of the user interface accessory of FIG. 1, showing the user interface removably fixed to an upper tactical rail of the tactical rail arrangement at the hot shoe.

With reference to FIGS. 6 and 7, connectivity between user interface accessory 28 and hot shoe 151 is shown. Hot shoe 151 is arranged on upper tactical rail 102 at receiver end 116 (shown in FIG. 1) and includes a first receiver end non-contact optical connection 153, a second receiver end non-contact optical connection 155, a third receiver end non-contact optical connection 157, and a contact electrical connection 159. User interface 28 is removably fixed to upper tactical rail 102 at hot shoe 151 and includes a three corresponding non-contact optical interfaces. In this respect a first non-contact optical interface 161 of user interface accessory 28 corresponds to first receiver end non-contact optical connection 153, a second non-contact optical interface 165 of user interface accessory 28 corresponds to a second receiver end non-contact optical connection 155, and a third non-contact optical interface 167 of user interfaced accessory 28 corresponds to third receiver end non-contact optical connection 157 to provide optical communication between user interface accessory 28 and accessories removably fixed to non-contact optical connections arranged on tactical rail arrangement 100 via optical switch 70.

As also shown in FIG. 6, user interface accessory 28 also includes an electrical interface for electrical communication with contact electrical connection 159, which provides electrical power to user interface accessory 28. In certain embodiments the electrical interface provides connectivity for data communication between low speed data bus 52 and high speed data bus 54, user interface accessory 28 serving a gateway terminal between low speed data bus 52 and high speed data bus 54 in a hybrid bus topology 74 (shown in FIG. 8).

Figure 8:
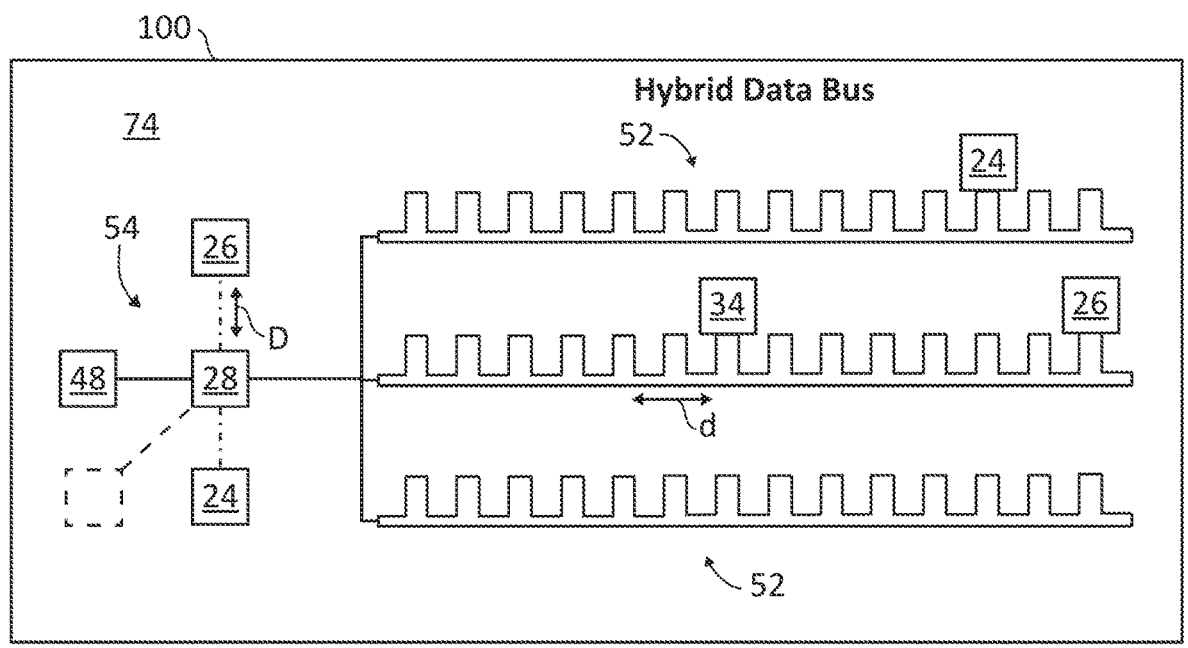
FIG. 8 is a schematic diagram of a hybrid data bus routed through both a low speed data bus and a high speed data bus within of the tactical rail arrangement, showing the user interface arranged as the hub of the high speed data bus and as a terminal in the low speed data bus.

With reference to FIG. 8, hybrid bus topology 74 is shown. Hybrid bus topology 74 includes low speed data bus 52 and high speed data bus 54 connected to one another through user interface accessory 28. Low speed data bus 52 is connected to high speed data bus 54 at hot shoe 151, user interface 28 connecting to low speed data bus 52 through contact electrical connection 159 (shown in FIG. 6) and to high speed data bus 54 through one or more of non-contact optical connections 153/155/157 (shown in FIG. 6). Connection to both low speed data bus 52 and high speed data bus 54 allows user interface accessory 28, through operation of optical switch 70 as circuitry, to both switch high speed data D between spokes of high speed data bus 54 as well as operate a gateway to low speed data bus 52 to receive and pass low speed data therethrough.

Advantageously, all switching occurs outside of tactical rail arrangement 100 and within user interface accessory 28. In certain embodiments tactical rail arrangement 100 can include no electronics within the tactical rails themselves, reducing (or eliminating entirely) the need to remove tactical rails from firearm 12 to troubleshoot problems with either low speed data bus 52 and/or high speed data bus 54. This allows a user to troubleshoot connectivity among the accessories by switching out accessories removably fixed to tactical arrangement 100, e.g., by replacing user interface accessory 28.

Figure 9:
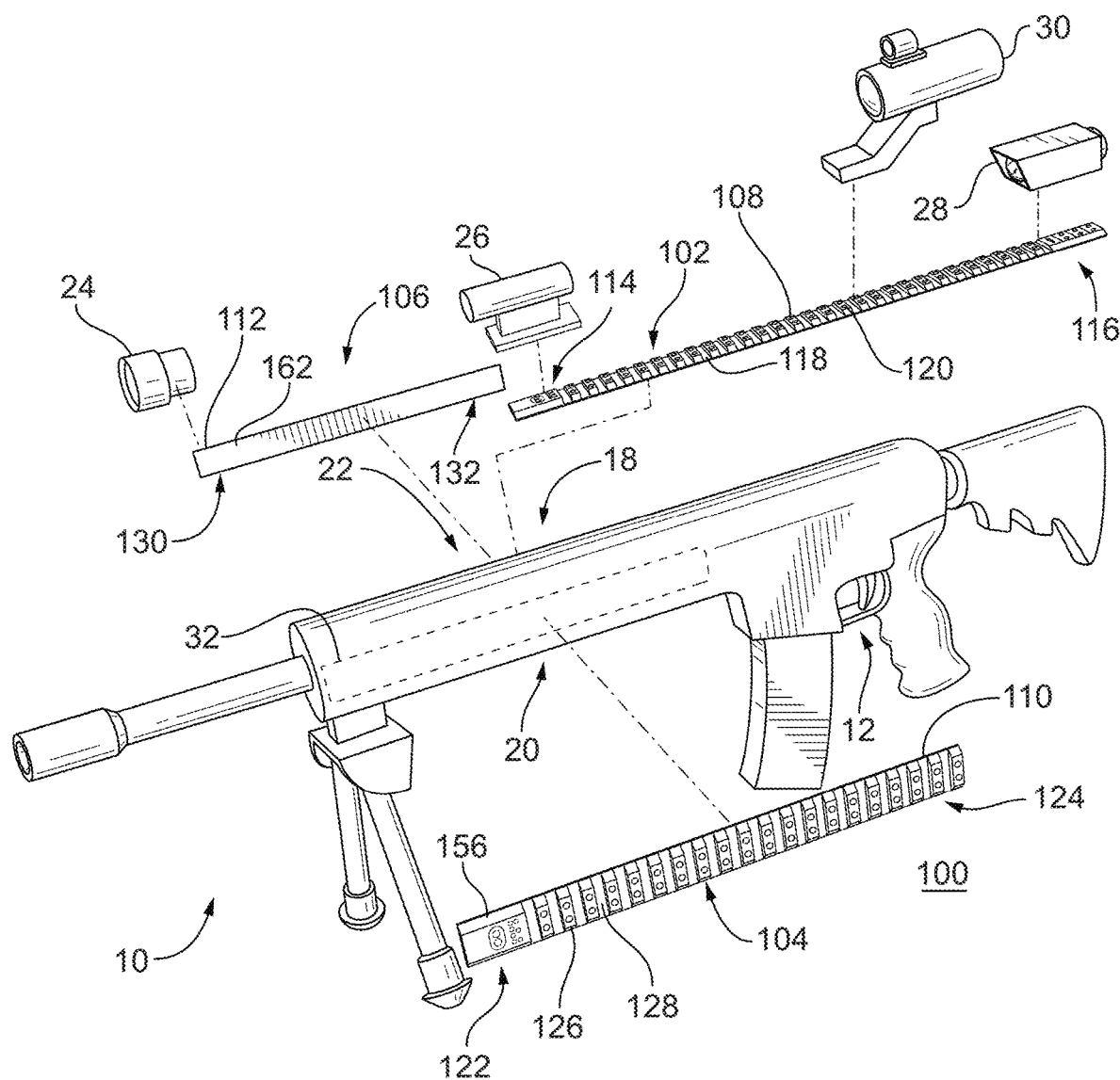
FIG. 9 is an exploded view of the firearm assembly of FIG. 1, showing the upper tactical rail, the right tactical rail, and the left tactical rail and accessories exploded away from the firearm.

With reference to FIG. 9, firearm assembly 10 is shown with the tactical rails of tactical rail arrangement 100 exploded away from firearm 12. Upper tactical rail 102 has a rail body 108 configured to seat on an upper side 18 of firearm 12. Left tactical rail 104 has a rail body 110 configured to seat on a left side 20 of firearm 12. Right tactical rail 106 has a rail body 112 configured to seat on a right side 22 of firearm 12. One or more of rail body 108, rail body 110, and/or rail body 112 is interchangeable with a handguard 32 of firearm 12. As shown in FIG. 9 rail body 108 is configured for fixation to firearm 12 as an upper tactical rail, rail body 110 is configured for fixation to firearm 12 a left tactical rail, rail body 112 is configured for fixation to firearm 12 as a right tactical rail, and each of accessories 24-30 are configured for removable fixation to any one of upper tactical rail 102, right tactical rail 104, and left tactical rail 106.

Rail body 108 extends between a muzzle end 114 and a receiver end 116. Between muzzle end 114 and receiver end 116 rail body 108 defines a plurality of ribs 118 and slots 120. Ribs 118 and slots 120 are axially spaced apart from one another along rail body 108 between muzzle end 114 and receiver end 116.

Ribs 118 and slot 120 are configured and adapted to removably fix accessories to firearm 12. For example, rail body 108 can include a bracket used on some firearms to provide a standardized accessory mounting platform for removably fixing accessories to rail body 108. Alternatively, rail body 108 has a series of ridges with a T-shaped cross-section interspersed with flat "locking slots" (also termed "recoil groove"). Accessories can be removably fixed either by sliding the accessory from one end of rail body 108 toward the opposite end of rail body 108, establishing electrical contact between the accessory and a contact electrical connection arranged along rail body 108, and fixing the accessory to rail body 108 by manipulating a "rail-grabber" which is clamped to rail body 108 with bolts, thumbscrews, or levers, or onto the slots between ribs 118.

In certain embodiments rail body 108 conforms to a Weaver rail system standard. In accordance with certain embodiments rail body 108 conforms to a Warsaw Pact rail system standard. In further embodiments rail body 108 conforms to a KeyMod rail system standard or an M-LOK rail system standard. It is also contemplated that rail body 108 conforms to a NATO STANAG 4694 rail system standard, or a MIL-STD-1913 rail system standard. In this respect rail body 108 can conform to MIL-STD-1913 (NOTICE 2), MILITARY STANDARD: DIMENSIONING OF ACCESSORY MOUNTING RAIL FOR SMALL ARMS WEAPONS (3 Oct. 2013) and/or MIL-STD-1013, dated 20 Apr. 2004, each of which are incorporated herein by reference in their entirety.

Rail body 110 of left tactical rail 104 is similar to rail body 108 of upper tactical rail 102 with the differences that rail body 110 includes single non-contact optical connection 156. In this respect rail body 110 extends longitudinally between a muzzle end 122 and a receiver end 124 and is configured and adapted to be fixed to left side 20 of firearm 12. Between muzzle end 122 and receiver end 124 rail body 110 defines a plurality of ribs 126 and slots 128 that are axially spaced apart from one another along rail body 110 between a muzzle end 122 and receiver end 124.

As with ribs 118 and slots 120, ribs 126 and slots 128 are configured and adapted to removably fix accessories to rail body 108, e.g., to a Weaver rail system standard, a Warsaw Pact rail system standard, a KeyMod rail system standard, an M-LOK rail system standard, a MIL-STD-1913 rail system standard, or a NATO STANAG 4694 rail system standard. Rail body 112 of right tactical rail 106 is similar to rail body 110 of right rail body 112 with the difference that rail body 112 extends between a muzzle end 130 and a receiver end 132 and is configured and adapted to be fixed to right side 22 of firearm 12.

Figure 10:
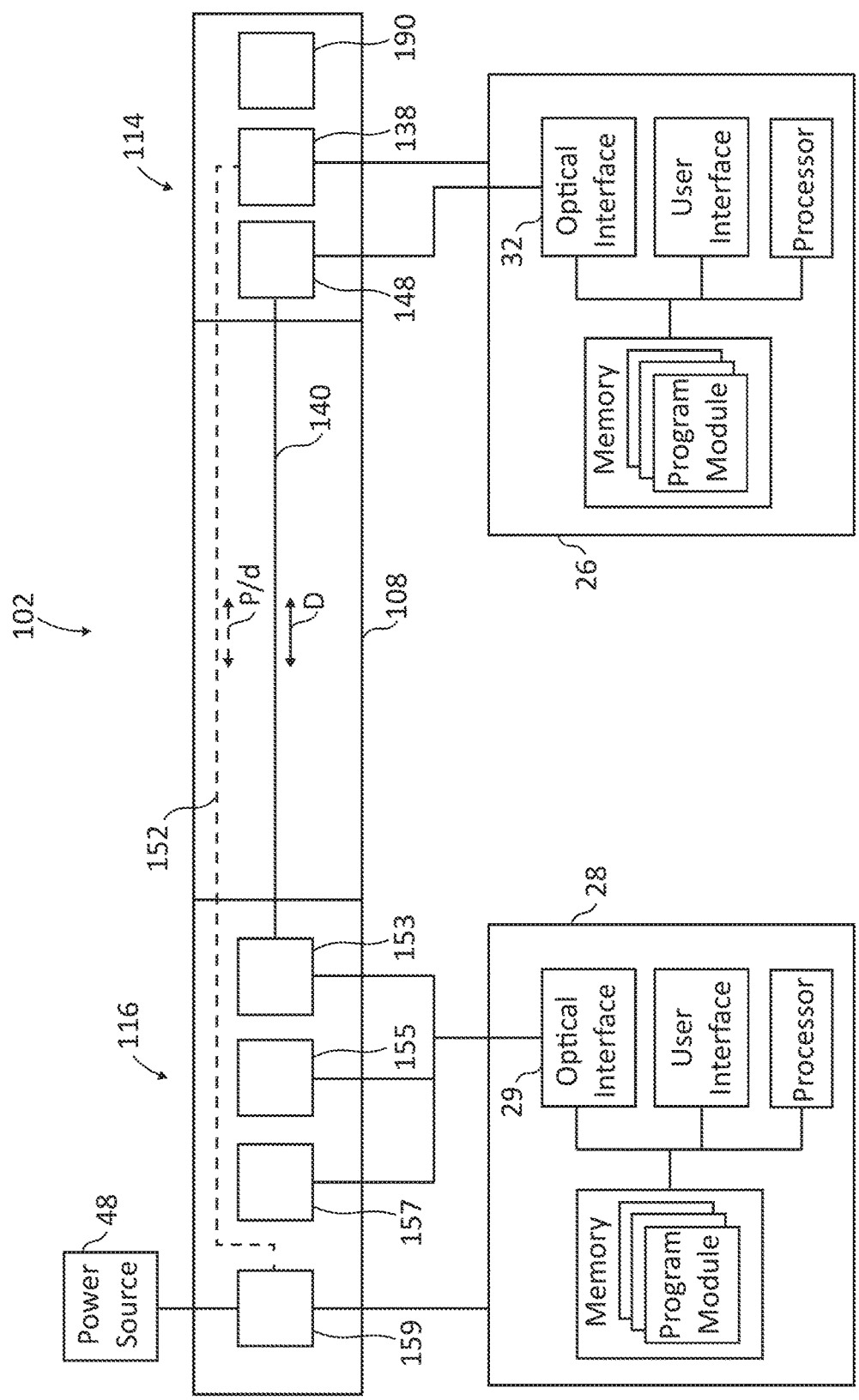
FIGS. 10 and 11 are schematic and plan views of the upper tactical rail of FIG. 1, showing non-contact optical connections arranged at the muzzle and receiver ends of the rail body and contact electrical connections arranged along the rail body of the upper tactical rail.
Figure 11:
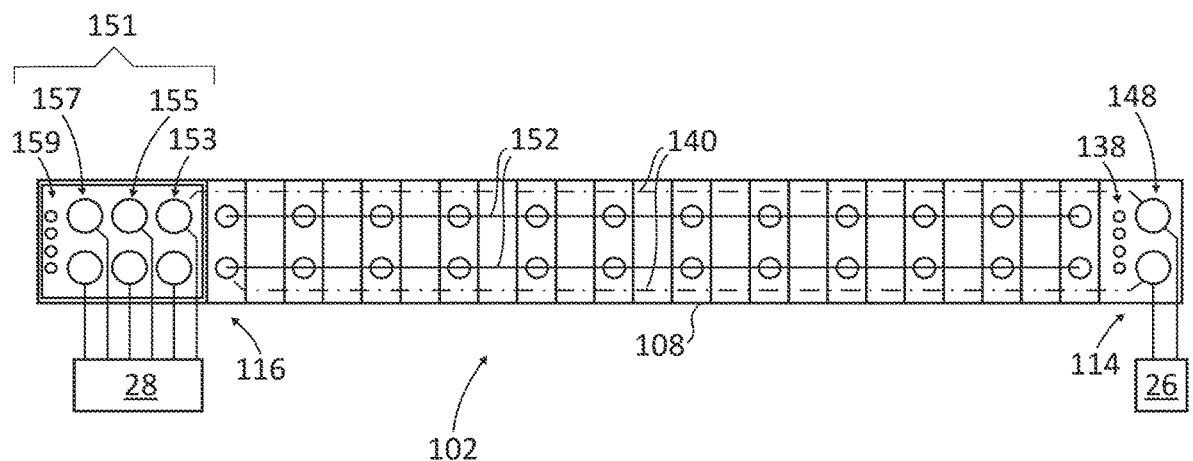

With reference to FIGS. 10 and 11, upper tactical rail 102 is shown. Referring to FIG. 10, upper tactical rail 102 includes rail body 108 with receiver end 116 and opposed muzzle end 114. Non-contact optical connection 148 is arranged at muzzle end 114 to optically couple with a corresponding non-contact optical interface, e.g., a non-contact optical interface 32, of accessory 26. First receiver end non-contact optical connection 153, second receiver end non-contact optical connection 155, and third receiver end non-contact optical connection 157 are each arranged at receiver end 116 of rail body 108 to optically couple with corresponding non-contact optical interfaces 29 of user interface accessory 28, thereby providing high speed data communication D (shown in FIG. 10) with accessories removably fixed to tactical rail arrangement 100. High speed data spoke 140 connects first receiver end non-contact optical connection 153 with non-contact optical connection 148 for passing high speed data D (shown in FIG. 10) between accessory 26 and user interface 28, and is a rail spoke fixed within upper tactical rail 102.

It is contemplated that rail spoke 140 of upper tactical rail 102 be an optical waveguide. In certain embodiments rail spoke 140 can include a fiber optic or fiber optic bundle, a glass light pipe, or a plastic light pipe by way on non-limiting example. As shown in FIG. 11, rail spoke 140 can include a plurality of optical waveguide to allow user interface accessory 28 and accessory 26 to send and receive high speed data D between one another at the same time. It is also contemplated that upper tactical rail 102 can include optical-electrical signal converter connected to non-contact optical connection 148 and first receiver end non-contact optical connection 153, rail spoke 140 being a conductor electrically connecting the optical-electrical converters.

Upper tactical rail 102 also includes a muzzle end contact electrical connection 138, a receiver end contact electrical connection 159, and upper rail bus segment 152. Muzzle end contact electrical connection 138 is co-located with muzzle end non-contact electrical connection 148 to provide electrical power P and/or low speed data communication d accessory 26 when removably fixed to muzzle end 114 of upper tactical rail 102. Receiver end contact electrical connection 159 is arranged within hot shoe 151 at receiver end 116 of upper tactical rail 102 to provide electrical power P and/or low speed data communication d to user interface accessory 28. Upper rail bus segment 152 electrically connects muzzle end electrical connection 138 with receiver end contact electrical connection 159 for communicating electrical power P from power source 48 to user interface accessory 28 and accessory 26 and/or low speed data d between user interface accessor 28 and accessory 26 when removably fixed to muzzle end 114 of upper tactical rail 102.

In certain embodiments upper rail bus segment 152 also communicates low speed data d between user interface 28 and accessory 26 through muzzle end electrical connection 138 and receiver end contact electrical connection 159. As shown in FIG. 11, upper tactical rail 102 can have a plurality of contact electrical connection 60. The plurality of contact electrical connection 60 are arranged axially along rail body 108 between muzzle end 114 and receiver end 116. It is contemplated that contact electrical connection 60 can include pogo pad-type contact electrical connections 61, each pogo pad pair include a positive contact and a negative contact accessible to an accessory removably fixed to rail body 108 between muzzle end 114 and receiver end 116. This provides connectivity for low speed data connectivity for legacy devices, e.g., accessory 30 (shown in FIG. 1), that otherwise may be unable to communicate via high speed data bus 54 (shown in FIG. 5)

Referring again to FIG. 10, upper tactical rail 102 can include an accessory detector 190. Accessory detector 190 is co-located with non-contact optical connection 148 and muzzle end contact electrical connection 138 on muzzle end 114 of upper tactical rail 102. Accessory detector 190 is configured to detect whether an accessory is removably fixed to upper tactical rail 102 at muzzle end 114. In this respect accessory detector 190 has an accessory-detected state and a no accessory-detected state.

In the accessory-detected state accessory detector 190 allows optical communication between first receiver end non-contact optical connection 153 and muzzle end non-contact optical connection 148. This allows user interface accessory 28 and accessory 26 to pass high speed data D between one another. In the no accessory-detected state accessory detector 190 prevents user interface accessory 28 from optically communicating with muzzle end non-contact optical connection 148, reducing (or eliminating entirely) the risk that light emitted therethrough could pose to a user. Communication between accessory detector 190 and user interface can be, for example, via upper rail bus segment 152. Accessory detector 190 can be implemented with, for example, with a hall-effect sensor, a pressure sensor, or a proximity sensor by way of non-limiting example. In certain embodiments change of state cause accessory detector 190 to initiate (or cease) optical communication between user interface accessory 28 and non-contact optical connection 148.

Figure 12:
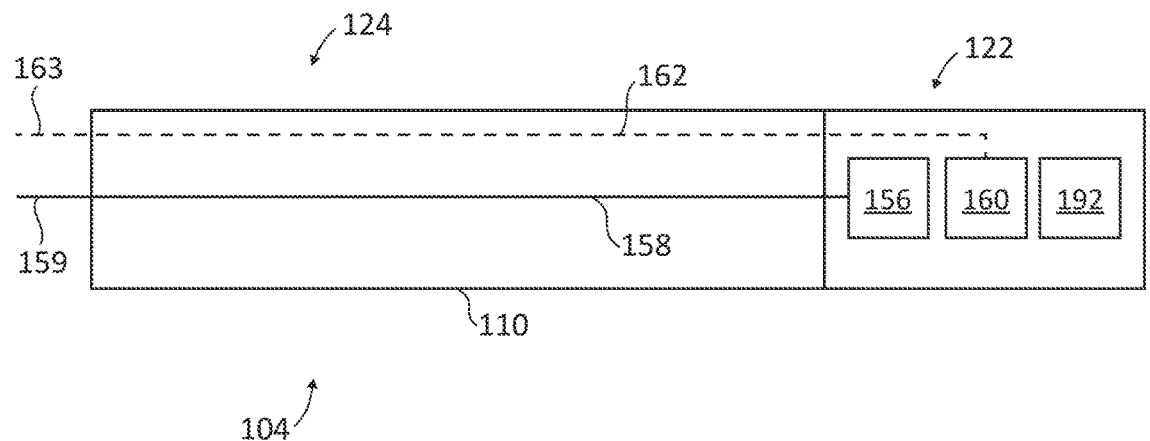
FIGS. 12 and 13 are schematic and plan views of the left tactical rail of FIG. 1, showing a non-contact optical connection arranged at the muzzle end of the left tactical rail and contact electrical connections arranged along the rail body of the left tactical rail.
Figure 13:
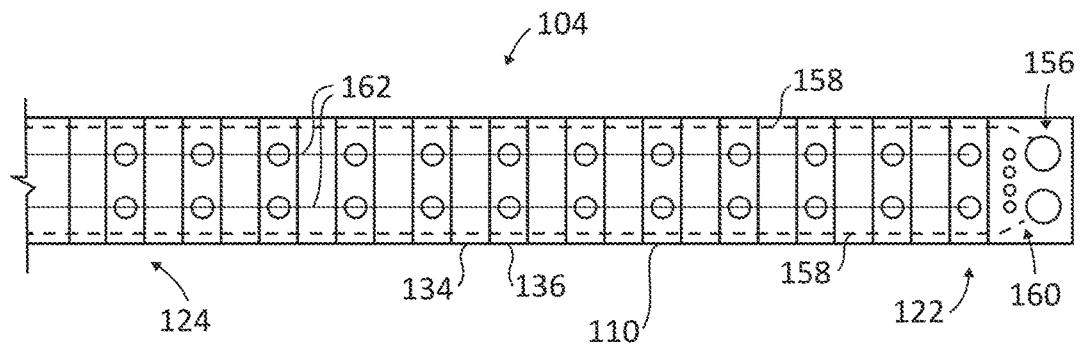

With reference to FIGS. 12 and 13, left tactical rail 104 is shown. Left tactical rail 104 is similar to upper tactical rail 102 (shown in FIG. 1) with the differences that left tactical rail 104 has a rail body 110 arranged to attach to left side 22 (shown in FIG. 9) of weapon 12 (shown in FIG. 1), has a single non-contact optical connection 156, includes a low speed crossover segment 163, and a high speed crossover spoke 159. Rail body 110 extends between muzzle end 122 and receiver end 124. Non-contact optical connection 156 is arranged at muzzle end 130 and is configured to interface with a corresponding non-contact optical interface. Low speed crossover segment 163 is electrically connected bus segment 152 and contact electrical connection 159 (shown in FIG. 11). High speed crossover spoke 159 is optically coupled to bus spoke 158 and is configured to connect with a non-contact optical connection of another tactical rail, e.g., to second receiver end non-contact optical connection 155 (shown in FIG. 11).

Non-contact optical connection 156 is similar to muzzle end non-contact optical connection 148 (shown in FIG. 10) and is additionally connected to left rail spoke 158. Left rail spoke 158 is configured for connecting to second receiver end non-contact optical connection 155 (shown in FIG. 10). As will be appreciated by those of skill in the art in view of the present disclosure, left rail spoke 158 and left tactical rail non-contact optical connection 156 allow for communication of high speed data D between user interface accessory 28 (shown in FIG. 10) and an accessory removably fixed at muzzle end 130 of left tactical rail 104. As shown in FIG. 13, left rail spoke 158 can include two optical waveguides, allowing user interface accessory 28 and another accessory to send and receive high speed data between one another at the same time through left rail spoke 158.

A contact electrical connection 160 is co-located with non-contact optical connection 156 at muzzle end 130. Left rail bus segment 162 is electrically connected to contact electrical connection 160 and is configured for electrical connection with power source 48 (shown in FIG. 10) through upper tactical rail 102 (shown in FIG. 10). In certain embodiments left rail bus segment 162 also communicates low speed data d between user interface 28 and an accessory removably fixed at muzzle end 130 through receiver end contact electrical connection 159 and contact electrical connection 160. As shown in FIG. 13, left tactical rail 104 can have similarly have a plurality of contact electrical connections 60 arranged axially along rail body 112 between muzzle end 130 and receiver end 132. In certain embodiments contact electrical connections 60 include pogo pad-type contact electrical connections 61 comprising positive and negative contacts at a shared axial location, for example.

In certain embodiments left tactical rail 104 can have an accessory detector 192. Accessory detector 192 is co-located with non-contact optical connection 156 and muzzle end contact electrical connection 160 on muzzle end 130 of left tactical rail 104 and is configured for detecting whether an accessory is removably fixed at muzzle end 130 of left tactical rail 104. Accessory detector 192 can be arranged to communicate electrically, using low speed data communication d, with user interface accessory 28 (shown in FIG. 10) through left rail bus segment 162.

It is contemplated that accessory detector 192 have an accessory-detected state and a no accessory-detected state. In the no accessory-detected state accessory detector 192 prevents optical communication between second receiver end non-contact optical connection 155 and non-contact optical connection 156 to prevent light conveyed through left rail spoke 158 from injuring a user. In the accessory-detected state accessory detector 192 allows optical communication between second receiver end non-contact optical connection 155 and non-contact optical connection 156. In the no accessory-detected state accessory detector 192 prevents optical communication through non-contact optical connection 156. Accessory detector 192 can be implemented with, for example, a hall-effect sensor, a pressure sensor, or a proximity sensor by way of non-limiting example, the sensor triggering communication or ceasing communication upon changing between accessory-detected and no accessory-detected state.

Figure 14:
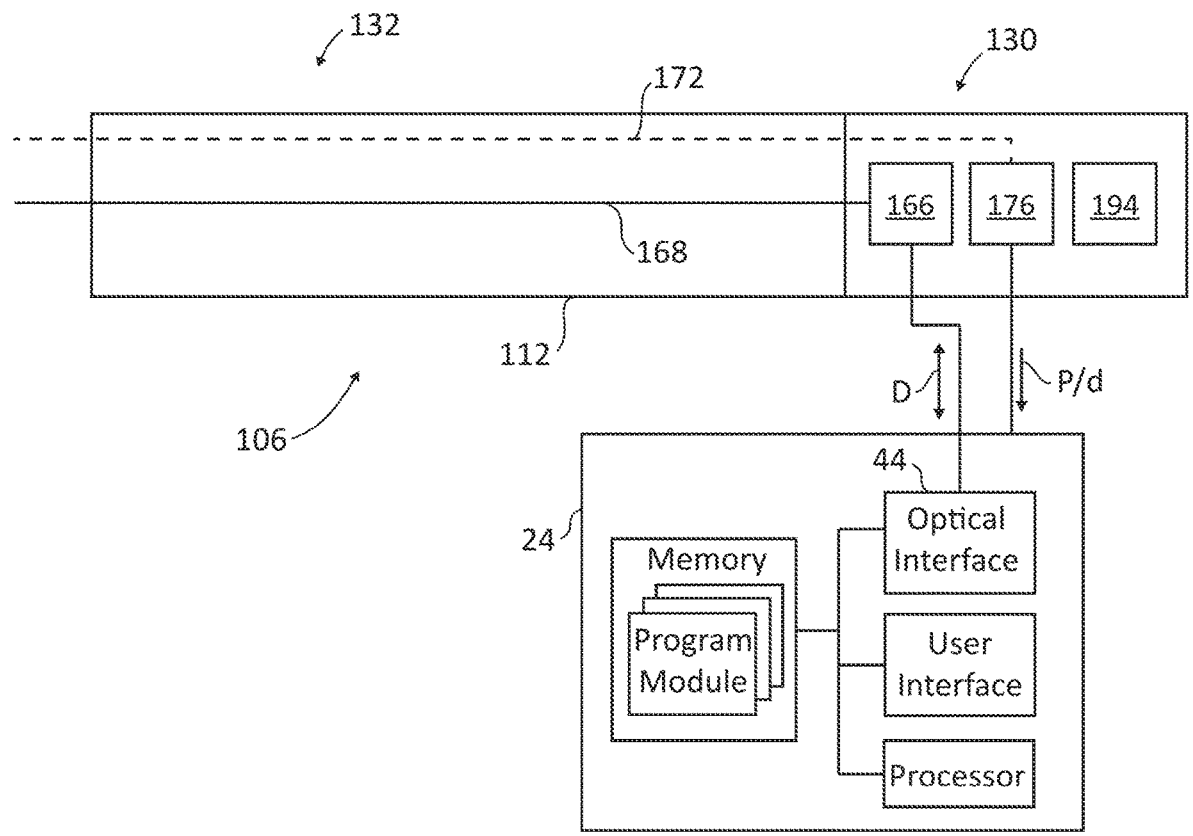
FIGS. 14 and 15 are schematic and plan views of the right tactical rail of FIG. 1, showing a non-contact optical connection arranged at the muzzle end of the right tactical rail and contact electrical connections arranged along the rail body of the right tactical rail.
Figure 15:
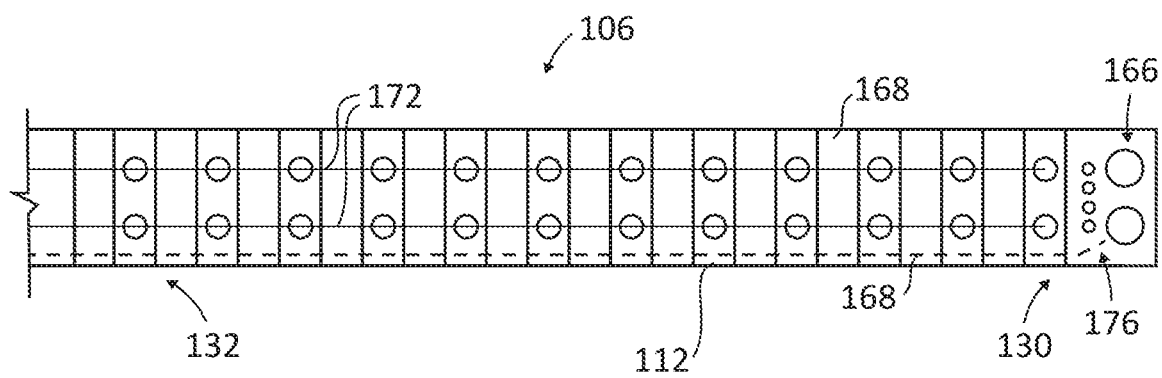

With reference to FIGS. 14 and 15, right tactical rail 106 is shown. Right tactical rail 106 is also similar to upper tactical rail 102 (shown in FIG. 1) and additionally has a rail body 112 arranged to attach to weapon right side 22 (shown in FIG. 9) and a single non-contact optical connection 166. Rail body 112 extends between a muzzle end 130 and receiver end 132. Non-contact optical connection 166 is arranged at muzzle end 130 and is configured to interface with a corresponding non-contact optical interface, e.g., optical interface 44 of accessory 24.

Non-contact optical connection 166 is optically coupled to right rail spoke 168. Right rail spoke 168 in turn is configured for connecting to third receiver end non-contact optical connection 157 (shown in FIG. 10) via a crossover spoke. As will be appreciated by those of skill in the art in view of the present disclosure, connection of third receiver end non-contact optical connection 157 with non-contact optical connection 166 allows for communication of high speed data D between user interface accessory 28 (shown in FIG. 10) and accessory 24 when removably fixed at muzzle end 130 of right tactical rail 106.

A contact electrical connection 176 is co-located with non-contact optical connection 166 at muzzle end 130. Right rail bus segment 172 is electrically connected to contact electrical connection 176 and is configured for electrical connection with power source 48 (shown in FIG. 10) through upper tactical rail 102 (shown in FIG. 10) via a bus crossover segment. In certain embodiments right rail bus segment 172 is also configured to communicate low speed data d between user interface accessory 28 and accessory 24 through receiver end contact electrical connection 159.

Right tactical rail 106 can have an accessory detector 194. Accessory detector 194 is co-located with non-contact optical connection 166 and muzzle end contact electrical connection 176 on muzzle end 130 of left tactical rail 104 and is configured for detecting whether an accessory is removably fixed at muzzle end 130 of left tactical rail 104. Accessory detector 194 can be arranged to communicate electrically, using low speed data communication d, with user interface accessory 28 (shown in FIG. 10) through right rail bus segment 172, whether an accessory is removably fixed to muzzle end 130 using an accessory-detected state and a no accessory-detected state as described above.

Figure 16:
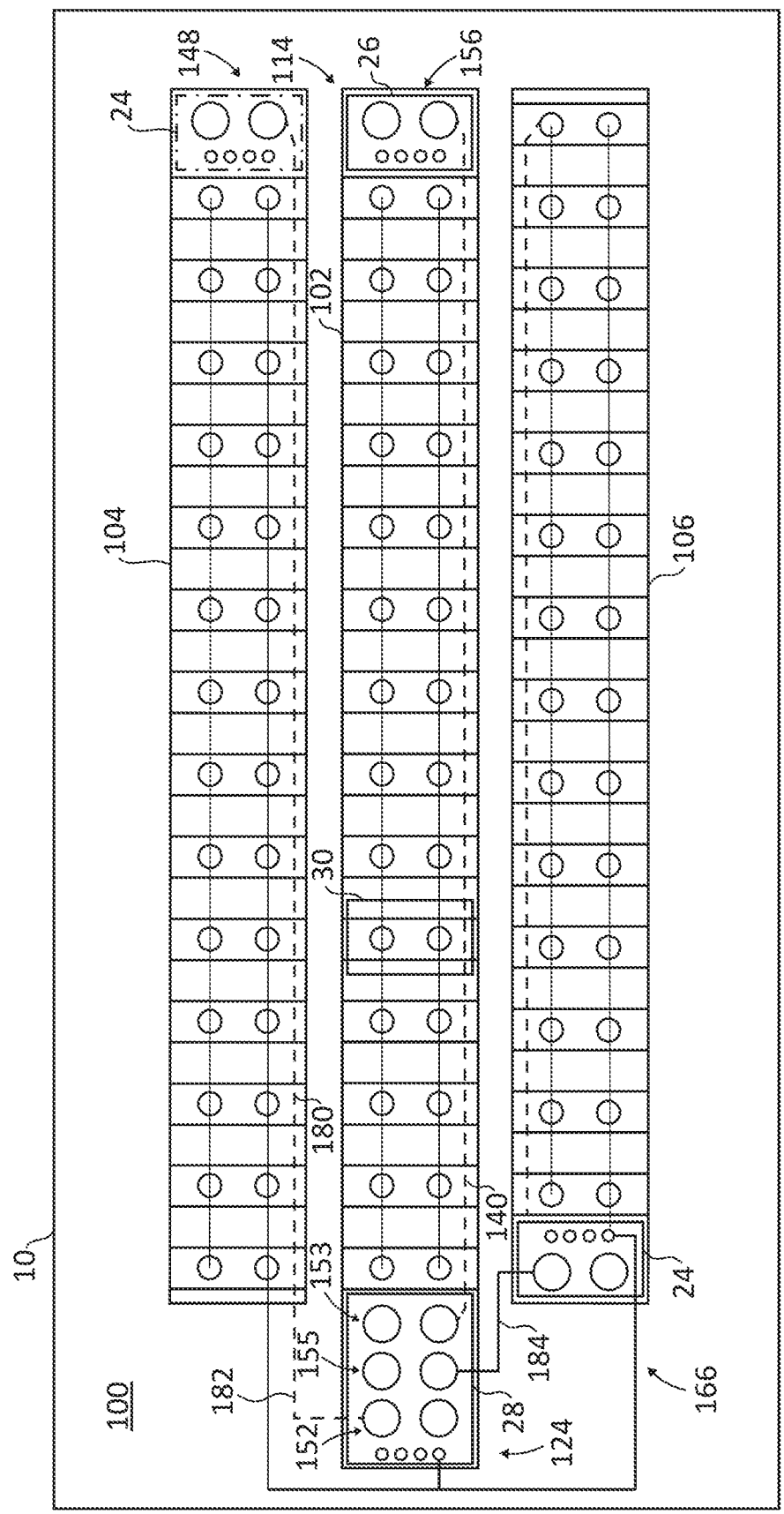
FIG. 16 is a plan view of another tactical rail arrangement of FIG. 1, showing connectivity of the high speed data spokes and power bus across the upper tactical rail, the left tactical rail and the right tactical rail, the right tactical rail having a non-contact optical connection at the receiver end of the right tactical rail.
Figure 17:
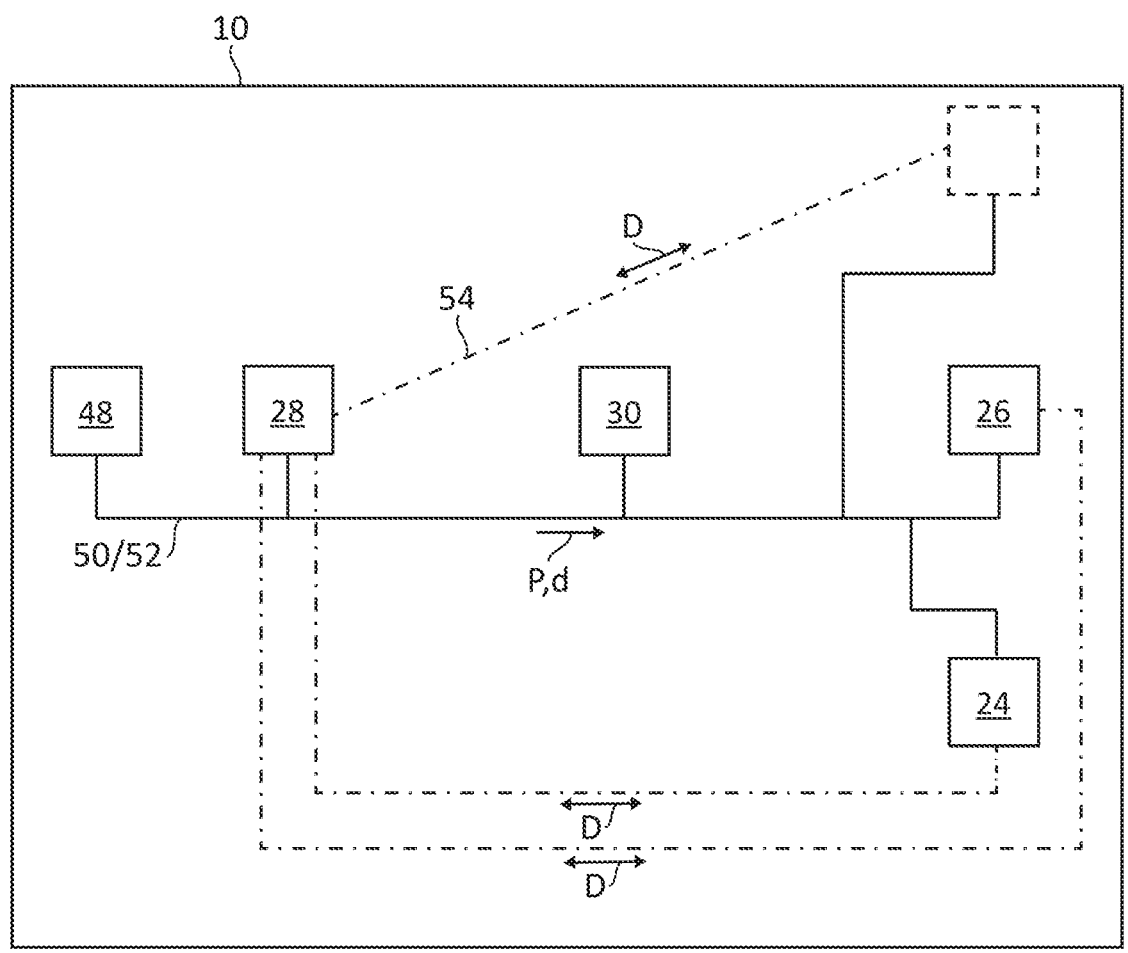
FIG. 17 is a schematic view of the tactical rail arrangement of FIG. 1, showing the high speed data spokes and power bus connected to high speed data accessories of a firearm assembly.

With reference to FIGS. 16 and 17, tactical rail arrangement 100 is shown according to an exemplary embodiment. Tactical rail arrangement 100 includes upper tactical rail 102 and either (or both) of left tactical rail 104 and right tactical rail 106. Upper tactical rail 102, left tactical rail 104, and right tactical rail 106 each have non-contact optical connections 60 and contact electrical connections 148/153/155/156/157/166 as described above. The contact electrical connections 60 are electrically connected to one another to define low speed bus 52 and the non-contact optical connections are optically coupled to one another to define high speed bus 54. High speed bus 54 is disposed in communication with low speed bus 52 to through user interface accessory 28, which serves a gateway terminal of low speed bus 52 and a hub of high speed bus 54 to define hybrid bus 74.

Non-contact optical connection 148 of upper tactical rail 102 is arranged at muzzle end 114 of upper tactical rail 102. First receiver end non-contact optical connection 153, second receiver end non-contact optical connection 155, and third receiver end non-contact optical connection 157 are arranged at receiver end 124 of upper tactical rail 102. High speed data spoke 140 of upper tactical rail 102, which is a rail spoke extending between muzzle end 114 and receiver end 124 of upper tactical rail 102, optically couples muzzle end non-contact optical connection 148 with first receiver end non-contact optical connection 155.

Non-contact optical connection 156 of left tactical rail 104 is arranged at muzzle end 122 or left tactical rail 102. High speed data spoke 158 includes a rail spoke 180 and a crossover spoke 182, optically coupled to one another, which both optically couple non-contact optical connection 156 to second receiver end non-contact optical connection 155. In the illustrated exemplary embodiment non-contact optical connection 166 of right tactical rail 106 is arranged at receiver end 132 of right tactical rail 106, and is optically coupled to third receiver end non-contact optical connection 157 of upper tactical rail 102 through high speed data spoke 168, which as illustrated in FIG. 16 is optically coupled through a crossover spoke 168. As will be appreciated by those of skill in the art in view of the disclosure, the illustrated exemplary arrangement allows positioning accessories, e.g. accessory 24, at the receiver end of firearm 12 to manage the center of gravity of firearm assembly 10.

The methods and systems of the present disclosure, as described above and shown in the drawings, provide for tactical rails, tactical rail arrangements, and firearm assemblies having tactical rail arrangements with superior properties including the capability to provide bandwidth suitable for high speed data communications to accommodate future data and video bandwidth requirements. For example, gigabit per second data communication can be provided with an optical high speed data spoke, and in certain embodiments, the optical high speed data spoke supplemented by a low speed wired data bus with 100-200 megabit per second low speed electrical data communications capability. The methods and systems of the present disclosure can also, in certain embodiments, provide bandwidth suitable for high speed data communication without permanently mounting electronics, e.g., PCB structures and/or integrated circuits, within the tactical rails or elsewhere on the firearm assembly. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A tactical rail for a firearm, comprising:
a rail body having a receiver end and a muzzle end;
a non-contact optical connection arranged at an end of the rail body and configured to interface with a corresponding non-contact optical interface;
a high speed data spoke connected to the non-contact optical connection for high speed data communication with a high speed data accessory through the non-contact optical connection and the corresponding non-contact optical interface; and
an optical switch configured to direct optical signal to the high speed data spoke and direct optical signal away from the high speed data spoke.

2. The tactical rail as recited in claim 1, wherein the non-contact optical connection is arranged on the receiver end of the rail body.

3. The tactical rail as recited in claim 2, wherein the high speed data spoke is a rail spoke extending between the receiver end and the muzzle end of the rail body.

4. The tactical rail as recited in claim 2, wherein the high speed data spoke is a crossover spoke to connect with a non-contact optical connection of another tactical rail.

5. The tactical rail as recited in claim 1, wherein the non-contact optical connection is arranged on the muzzle end of the rail body.

6. The tactical rail as recited in claim 5, wherein the high speed data spoke extends from the receiver end of the rail body to the muzzle end of the rail body.

7. The tactical rail as recited in claim 5, wherein the high speed data spoke is a crossover spoke to connect with a non-contact optical connection of another tactical rail.

8. The tactical rail as recited in claim 1, wherein the non-contact optical connection is a receiver end non-contact optical connection arranged at the receiver end of the rail body, and further comprising a muzzle end non-contact optical connection arranged at the muzzle end of the rail body, wherein the high speed data spoke connects the muzzle end non-contact optical connection with the receiver end non-contact optical connection.

9. The tactical rail as recited in claim 1, wherein the non-contact optical connection is a first receiver end non-contact optical connection and further comprising a second receiver end noncontact optical connection arranged on the receiver end of the rail body.

10. The tactical rail as recited in claim 9, further comprising a crossover spoke connected to the second receiver end non-contact optical connection, the crossover spoke configured to connect with a non-contact optical connection of another tactical rail.

11. The tactical rail as recited in claim 9, further comprising a third receiver end non-contact optical connection arranged on the receiver end of the rail body and adjacent to the second receiver end non-contact optical connection.

12. The tactical rail as recited in claim 11, further comprising a crossover spoke connected to the third receiver end non-contact optical connection, the crossover spoke configured to connect with a non-contact optical connection of another tactical rail.

13. The tactical rail as recited in claim 1, further comprising a power bus rail segment extending between the receiver end and the muzzle end of the rail body.

14. The tactical rail as recited in claim 13, wherein the power bus includes a contact electrical connection co-located with the non-contact optical connection.

15. The tactical rail as recited in claim 13, wherein the power bus includes a rail segment extending between the muzzle end of the rail body and the receiver end of the rail body.

16. The tactical rail as recited in claim 13, wherein the power bus includes a crossover bus segment configured to electrically connect the power bus rail segment to another tactical rail.

17. The tactical rail as recited in claim 1, further comprising a high speed data accessory fixed to the tactical rail and in optical communication with the non-contact optical connection.

18. The tactical rail as recited in claim 17, wherein the high speed data accessory is a first high speed data accessory and further comprising a second high speed data accessory, wherein the second high speed data accessory is in high speed data communication with the first high speed data accessory through the high speed data spoke.

19. The tactical rail as recited in claim 18, wherein the first high speed data accessory and the second high speed data accessory are removably fixed to the tactical rail.

20. The tactical rail as recited in claim 18, wherein the second high speed data accessory is optically coupled to another tactical rail through the non-contact optical connection.

21. The tactical rail as recited in claim 1, wherein the high speed data spoke includes an optical waveguide.

22. The tactical rail as recited in claim 1, wherein the high speed data spoke includes a fiber optic or fiber optic bundle, a glass light pipe, or a plastic light pipe.

23. The tactical rail as recited in claim 1, further comprising an accessory detector co-located with the non-contact optical connection.

24. The tactical rail as recited in claim 23, wherein the accessory detector includes one of a hall-effect sensor, a pressure sensor, and a proximity sensor.

25. The tactical rail as recited in claim 23, wherein the accessory detector has an accessory-detected state and a no accessory-detected state, the accessory detector preventing optical communication through non-contact optical connection in the no accessory-detected state, the accessory detector triggering optical communication in the accessory-detected state.

26. The tactical rail as recited in claim 1, wherein the rail body is interchangeable with a handguard for a firearm.

27. The tactical rail as recited in claim 1, wherein the rail body is configured for fixation to a firearm as an upper tactical rail, a right-hand tactical rail, or a left-hand tactical rail.

28. The tactical rail as recited in claim 1, wherein the rail body has a plurality of ribs and slots axially spaced along the rail body between the receiver end of the tactical rail and the muzzle end of the rail body.

29. The tactical rail as recited in claim 1, wherein the rail body conforms to a Weaver, a Warsaw Pact, a KeyMod, an M-LOK, or a MIL-STD-1913 rail standard.

30. The tactical rail as recited in claim 1, further comprising an optical-electrical signal converter connected to the non-contact optical connection, wherein the high speed data spoke is in electrical communication with the optical-electrical signal converter.

31. A tactical rail arrangement for a firearm, comprising:
   upper and at least a left or right tactical rails as recited in claim 1, wherein the noncontact optical connection of the upper tactical rail is arranged on the muzzle end of the upper tactical rail, wherein the upper tactical rail includes first and second receiver end non-contact optical connections, upper tactical rail high speed data spoke optically coupling the muzzle end non-contact optical connection with the first receiver end non-contact optical connection, and
   wherein the high speed data spoke of the left or right tactical rail optically couples the non-contact optical connection of the left or right tactical rail and the second receiver end noncontact optical connection.

32. The tactical rail arrangement as recited in claim 31, wherein the left or right tactical rail is a rail spoke.

33. The tactical rail arrangement as recited in claim 31, wherein the left or right tactical rail is a crossover spoke.

34. A firearm assembly, comprising:
   a firearm having a muzzle and a receiver;
   a tactical rail as recited in claim 1, wherein the tactical rail is fixed to the firearm between the muzzle and the receiver of the firearm, wherein the non-contact optical connection is arranged at the receiver end of the tactical rail, the tactical rail further comprising:
      a muzzle end non-contact optical connection arranged at the muzzle end of the rail body, wherein the high speed data spoke connects the muzzle end non-contact optical connection with the receiver end non-contact optical connection; and
      a high speed data user interface accessory removably fixed at the receiver end of the tactical rail and in optical communication with the muzzle end non-contact optical connection through the receiver end non-contact optical connection.

* * * * *